United States Patent
Thomas et al.

(10) Patent No.: US 10,688,954 B2
(45) Date of Patent: Jun. 23, 2020

(54) AIRBAG ASSEMBLY WITH TETHERED REACTION SURFACE AND CUSHION CONFIGURED TO PERMIT FORWARD HEAD ROTATION

(71) Applicant: GM Global Technology Operations LLC, Detroit, MI (US)

(72) Inventors: Scott D. Thomas, Novi, MI (US); Brennon L. White, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 145 days.

(21) Appl. No.: 15/933,621

(22) Filed: Mar. 23, 2018

(65) Prior Publication Data

US 2019/0161049 A1 May 30, 2019

Related U.S. Application Data

(63) Continuation of application No. 15/825,665, filed on Nov. 29, 2017.

(51) Int. Cl.
| | |
|---|---|
| *B60R 21/216* | (2011.01) |
| *B60R 21/215* | (2011.01) |
| *B60R 21/214* | (2011.01) |
| *B60R 21/264* | (2006.01) |
| *B60R 21/00* | (2006.01) |
| *B60R 21/2338* | (2011.01) |

(52) U.S. Cl.
CPC .......... *B60R 21/216* (2013.01); *B60R 21/214* (2013.01); *B60R 21/215* (2013.01); *B60R 21/264* (2013.01); *B60R 2021/0048* (2013.01); *B60R 2021/23386* (2013.01)

(58) Field of Classification Search
CPC ..... B60R 21/216; B60R 21/13; B60R 21/215; B60R 21/214; B60R 21/264; B60R 2021/23388; B60R 2021/23384; B60R 2021/2395; B60R 2021/23386; B60R 2021/23382; B60R 2021/0048
See application file for complete search history.

(56) References Cited

U.S. PATENT DOCUMENTS

| | | |
|---|---|---|
| 3,866,940 A | 2/1975 | Lewis |
| 3,888,503 A | 6/1975 | Hamilton |
| 5,312,131 A | 5/1994 | Kitagawa et al. |
| 5,470,103 A | 11/1995 | Vaillancourt et al. |
| 5,472,228 A | 12/1995 | Bentley et al. |

(Continued)

OTHER PUBLICATIONS

U.S. Appl. No. 15/599,123, filed May 18, 2017, Mihm.

(Continued)

*Primary Examiner* — Drew J Brown

(57) ABSTRACT

An airbag assembly for mounting above an occupant in a vehicle includes an airbag housing and an airbag cushion. The airbag cushion is connected to the housing and is deployable from an uninflated state to an inflated state. The airbag cushion includes a forward portion and a rearward portion. The forward portion is positioned closer to the occupant than the rearward portion when the airbag cushion is in the inflated state. The forward portion is also separated from the rearward portion by a void. The void configured to cause a head of the occupant to rotate forward relative to a torso of the occupant when the occupant contacts the airbag cushion.

17 Claims, 15 Drawing Sheets

(56) References Cited

U.S. PATENT DOCUMENTS

| | | | |
|---|---|---|---|
| 5,480,181 A | 1/1996 | Bark et al. | |
| 5,564,734 A | 10/1996 | Stuckle | |
| 5,602,734 A | 2/1997 | Kithil | |
| 5,730,464 A | 3/1998 | Hill | |
| 5,797,620 A | 8/1998 | Eyrainer | |
| 6,065,798 A | 5/2000 | Sankrithi | |
| 6,070,902 A | 6/2000 | Kowalski et al. | |
| 6,113,132 A | 9/2000 | Saslecov | |
| 6,176,515 B1 | 1/2001 | Wallner et al. | |
| 6,217,059 B1 | 4/2001 | Brown et al. | |
| 6,336,653 B1 | 1/2002 | Yaniv et al. | |
| 6,722,691 B1 | 4/2004 | Håland et al. | |
| 7,195,276 B2 | 3/2007 | Higuchi | |
| 7,762,579 B2 | 7/2010 | Garner | |
| 8,157,291 B2 | 4/2012 | Mayer et al. | |
| 8,414,017 B2 | 4/2013 | Lee et al. | |
| 8,579,321 B2 | 11/2013 | Lee et al. | |
| 8,894,095 B1 | 11/2014 | Meister et al. | |
| 9,321,423 B2 | 4/2016 | Jaradi et al. | |
| 9,327,669 B2 | 5/2016 | Jaradi et al. | |
| 9,428,135 B1 | 8/2016 | Thomas et al. | |
| 9,446,731 B1 | 9/2016 | West et al. | |
| 9,446,735 B1 | 9/2016 | Jayasuriya et al. | |
| 9,457,642 B2 | 10/2016 | Kothari | |
| 9,610,915 B2 | 4/2017 | Specht et al. | |
| 9,663,058 B1 | 5/2017 | Whitens et al. | |
| 2002/0024204 A1 | 2/2002 | Fischer | |
| 2002/0053785 A1 | 5/2002 | Pausch et al. | |
| 2002/0056974 A1 | 5/2002 | Webert | |
| 2003/0192731 A1 | 10/2003 | Kikuchi et al. | |
| 2005/0023811 A1 | 2/2005 | Thomas | |
| 2005/0200108 A1* | 9/2005 | Keshavaraj | B60R 21/231 280/743.1 |
| 2006/0202451 A1 | 9/2006 | Nakanishi | |
| 2007/0045999 A1 | 3/2007 | Saberan et al. | |
| 2009/0295135 A1 | 12/2009 | Kumagai et al. | |
| 2010/0301591 A1 | 12/2010 | Kwon et al. | |
| 2011/0101652 A1 | 5/2011 | Abe | |
| 2012/0074677 A1 | 3/2012 | Hiruta et al. | |
| 2012/0133114 A1 | 5/2012 | Choi et al. | |
| 2012/0140126 A1 | 6/2012 | Werth et al. | |
| 2012/0280476 A1 | 11/2012 | Ory | |
| 2012/0292894 A1 | 11/2012 | Kobayashi et al. | |
| 2014/0197622 A1 | 7/2014 | Muraji et al. | |
| 2014/0265281 A1 | 9/2014 | Witt, Jr. et al. | |
| 2014/0291970 A1 | 10/2014 | Ory | |
| 2015/0061268 A1 | 3/2015 | Nagasawa | |
| 2015/0166185 A1 | 6/2015 | Oleson et al. | |
| 2015/0203066 A1 | 7/2015 | Pausch et al. | |
| 2016/0052636 A1 | 2/2016 | Moeller et al. | |
| 2017/0113646 A1 | 4/2017 | Lee et al. | |
| 2017/0144622 A1 | 5/2017 | Perlo et al. | |
| 2017/0158158 A1 | 6/2017 | Thomas | |
| 2017/0190311 A1 | 7/2017 | Schneider | |
| 2017/0282838 A1 | 10/2017 | Jung et al. | |
| 2018/0043852 A1 | 2/2018 | Fischer et al. | |
| 2018/0222432 A1 | 8/2018 | Schneider | |
| 2018/0229681 A1 | 8/2018 | Jaradi et al. | |
| 2019/0001795 A1 | 1/2019 | Muldrow | |
| 2019/0106073 A1 | 4/2019 | Sundararajan et al. | |

OTHER PUBLICATIONS

U.S. Appl. No. 15/784,468, filed Oct. 16, 2017, Thomas.
U.S. Appl. No. 15/825,665, filed Nov. 29, 2017, Thomas et al.
U.S. Appl. No. 15/825,800, filed Nov. 29, 2017, Thomas et al.
U.S. Appl. No. 15/825,921, filed Nov. 29, 2017, Thomas.

* cited by examiner

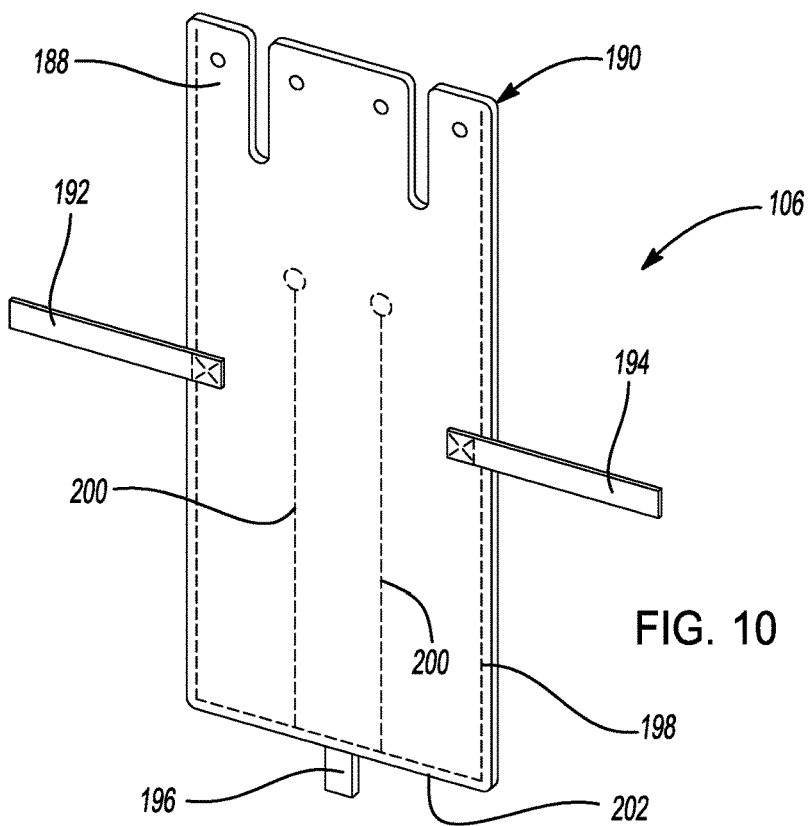
FIG. 10
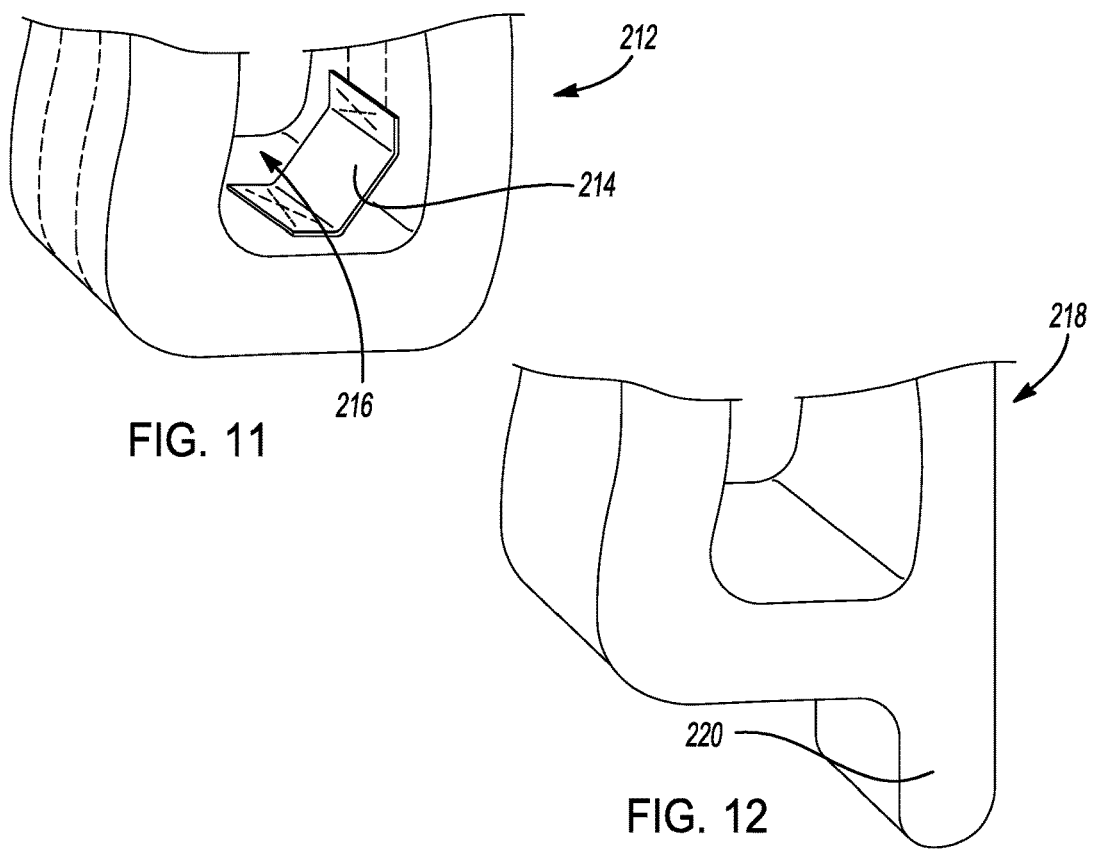
FIG. 11
FIG. 12

AIRBAG ASSEMBLY WITH TETHERED REACTION SURFACE AND CUSHION CONFIGURED TO PERMIT FORWARD HEAD ROTATION

CROSS-REFERENCE TO RELATED APPLICATIONS

This application is a continuation of U.S. patent application Ser. No. 15/825,665 filed on Nov. 29, 2017. The entire disclosure of the above application is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to airbag assemblies with tethered reaction surfaces and cushions that are configured to permit forward head rotation.

Airbag assemblies typically include an airbag cushion and an inflator that is operable to inflate the airbag cushion. The inflator includes a tube having a closed end containing a gas source and an open end opposite the closed end and positioned within the airbag cushion. The gas source typically includes an electric igniter and at least one of an explosive charge such as a solid propellant and a stored gas charge stored under high pressure. The electric igniter ignites the solid propellant and/or releases the stored gas in response to an electronic control signal, which produces a gas that inflates the airbag cushion.

Airbag assemblies are often mounted in a dashboard of a vehicle, in a seat of a vehicle and/or in a steering wheel of a vehicle. Some airbag assemblies, however, are mounted to a roof of a vehicle and inflate in a downward manner toward the occupants in the vehicle. Such airbag assemblies are commonly referred to as roof-mounted or overhead airbag systems.

SUMMARY

In one example in accordance with the present disclosure, an airbag assembly is configured for mounting above an occupant in a vehicle. The example airbag assembly includes an airbag housing that is configured to enclose an airbag cushion when the airbag cushion is in an uninflated state. The airbag cushion is connected to the airbag housing and is configured to project outward from the airbag housing when the airbag cushion inflates from the uninflated state to an inflated state. The example airbag assembly also includes a tether connected at a first attachment point and connected to the airbag cushion at a second attachment point. The first attachment point is located horizontally closer to the occupant than the second attachment point when the airbag cushion is in the inflated state such that the tether limits movement of the airbag cushion in a direction away from the occupant.

In one aspect, the first attachment point is located on the airbag housing.

In one aspect, the first attachment point is located on a roof of the vehicle.

In one aspect, the tether is positioned inside the airbag cushion.

In one aspect, the tether is stitched to the airbag cushion at the second attachment point.

In one aspect, the tether is connected to the vehicle at a third attachment point. The tether wraps around an exterior surface of the airbag cushion between the first attachment point and the third attachment point.

In one aspect, the example airbag assembly also includes a second tether. The second tether is connected to the vehicle at the first attachment point and is connected to the airbag cushion at a side attachment point. The side attachment point is positioned on the airbag cushion on a lateral side of the airbag cushion not facing the occupant.

In one aspect, the airbag housing includes a door. The door may be operable in a closed state and in an open state. The door may cover the airbag cushion when the airbag cushion is positioned inside the airbag housing in the uninflated state and may move away from the airbag housing to permit the airbag cushion to project outward from the airbag housing when the airbag cushion inflates to the inflated state. The tether is connected to the door causing the door to be positioned on a side of the airbag cushion away from the occupant to limit movement of the airbag cushion in the direction away from the occupant when the airbag cushion is in the inflated state.

In one aspect, the door includes a door tether attachment bracket rigidly fixed thereto. At least a portion of the door tether is routed through the door tether attachment bracket to retain the door tether to the door.

In one aspect, the airbag cushion includes at least one of a tethered vent and a pyrotechnic vent.

In one aspect, the airbag cushion includes a tethered vent that is configured to move from an open position to a closed position when the airbag cushion inflates to the inflated state and to not move from the open position to the closed position when an obstacle blocks the airbag cushion from inflating to the inflated state.

In one aspect, the airbag cushion includes a pyrotechnic vent configured to move from a closed position to an open position after a predetermined amount of time has elapsed since inflation of the airbag cushion or a door of the vehicle has been opened.

In one aspect, the example airbag assembly also includes a tether support. The tether support connected to the airbag cushion at the second attachment point to reinforce a region of the airbag cushion at the second attachment point.

In one aspect, the tether support is positioned between the tether and the airbag cushion.

In one aspect, the tether support is positioned inside the airbag assembly.

In one aspect, the airbag cushion includes a lower portion and an upper portion. The lower portion is positioned closer to the occupant than the upper portion. The upper portion and the lower portion permitting a head of the occupant to rotate forward relative to a torso of the occupant when the occupant contacts the airbag cushion.

In one aspect, the airbag cushion includes a void between inflated portions of the airbag cushion when the airbag is in the inflated state. The void permits a head of the occupant to rotate forward relative to a torso of the occupant when the occupant contacts the airbag cushion.

In one aspect, a first portion of the airbag cushion is connected to a second portion of the airbag cushion. The first portion can be rolled or folded back onto a second portion of the airbag cushion to form the void.

In one aspect, the airbag cushion includes a plurality of longitudinal chambers configured to stiffen the airbag cushion.

In another example in accordance with the present disclosure, an example airbag assembly can be mounted in a roof of a vehicle above and forward of an occupant. The example airbag assembly includes an airbag housing and an inflator connected to the airbag housing. The example airbag assembly also includes an airbag cushion connected to the airbag housing and in fluid communication with the inflator. The airbag cushion includes a lower portion and an upper portion and is operable in an uninflated state and in an inflated state. The airbag cushion inflates from the uninflated state to the inflated state when gas is released by the inflator. When the airbag cushion is in the inflated state, the lower portion is positioned at a first vertical height relative to the roof of the vehicle to engage a torso of the occupant and the upper portion is positioned at a second vertical height relative to the roof of the vehicle to engage a head of the occupant. The upper portion and the lower portion permit the head of the occupant to rotate forward relative to the torso of the occupant when the occupant contacts the airbag cushion.

The example airbag assembly also includes an external tether connected to the roof of the vehicle at a first attachment point and to the airbag cushion at a second attachment point. The second attachment point is located below the first attachment point and at a horizontal position further away from the occupant than the first attachment point such that the tether extends diagonally downward and away from the first attachment point to the second attachment point along an exterior surface of the airbag cushion when the airbag cushion is in the inflated state.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 10 is a view of the airbag cushion of FIG. 9 shown at an intermediate stage of manufacture showing an example structure of the airbag cushion;

FIG. 11 is an illustration showing an example shaping tether;

FIG. 12 is an illustration showing an alternative shape of an airbag cushion of the present disclosure;

In the drawings, reference numbers may be reused to identify similar and/or identical elements.

DETAILED DESCRIPTION

Existing airbag assemblies are often mounted in dashboards, in seats or in steering wheels of vehicles. In such circumstances, the airbag cushions of these airbag assemblies inflate toward an occupant of the vehicle from the dashboard, seat or steering wheel. When the occupant contacts the airbag cushion, the airbag cushion is compressed between the occupant and the dashboard, seat or steering wheel to absorb energy.

In roof-mounted or overhead airbag assemblies, the airbag cushion often inflates downward toward the occupant from the roof or overhead structure in the vehicle. In some instances, the airbag cushion of the overhead airbag assembly is positioned between an occupant and another structure in the vehicle such as a dashboard, a windshield, a seat or a steering wheel. In such instances, the airbag cushion is compressed between the occupant and the dashboard, windshield, seat or steering wheel and can perform similarly to non-overhead airbag assemblies.

In other instances, however, an overhead airbag assembly may be inflated downward toward an occupant of a vehicle in a location where no suitable structure exists in the vehicle that the inflated airbag cushion can be compressed against when the occupant contacts the airbag cushion. In such instances, the overhead airbag cushion can be said to lack a suitable reaction surface. Without a suitable reaction surface, the inflated airbag cushion moves away from an occupant without absorbing energy when the occupant contacts the airbag cushion. The airbag cushion, without a suitable reaction surface, can be pushed aside or displaced without absorbing energy as intended.

In such instances where the geometry or structure of a vehicle lacks a suitable external reaction surface (e.g., a dashboard, a windshield, a seat, or a steering wheel), an airbag assembly of the present disclosure can include one or more tethers that are positioned to serve as a reaction surface for the airbag cushion. The one or more tethers are connected to the airbag cushion and to a rigid structure in the airbag assembly and/or in the vehicle. The one or more tethers restrict the movement of the inflated airbag cushion when an occupant contacts the airbag cushion.

In other example airbag cushions in accordance with the present disclosure, the airbag cushions are shaped in a manner to reduce the forces and moment on the neck of an occupant when the occupant engages the airbag cushion. The airbag cushions can include a curved portion and/or a hollow portion that can permit the airbag cushion to deflect in a manner that permits the head of an occupant to pivot forward while absorbing energy when the occupant engages the airbag cushion.

Figure 1:
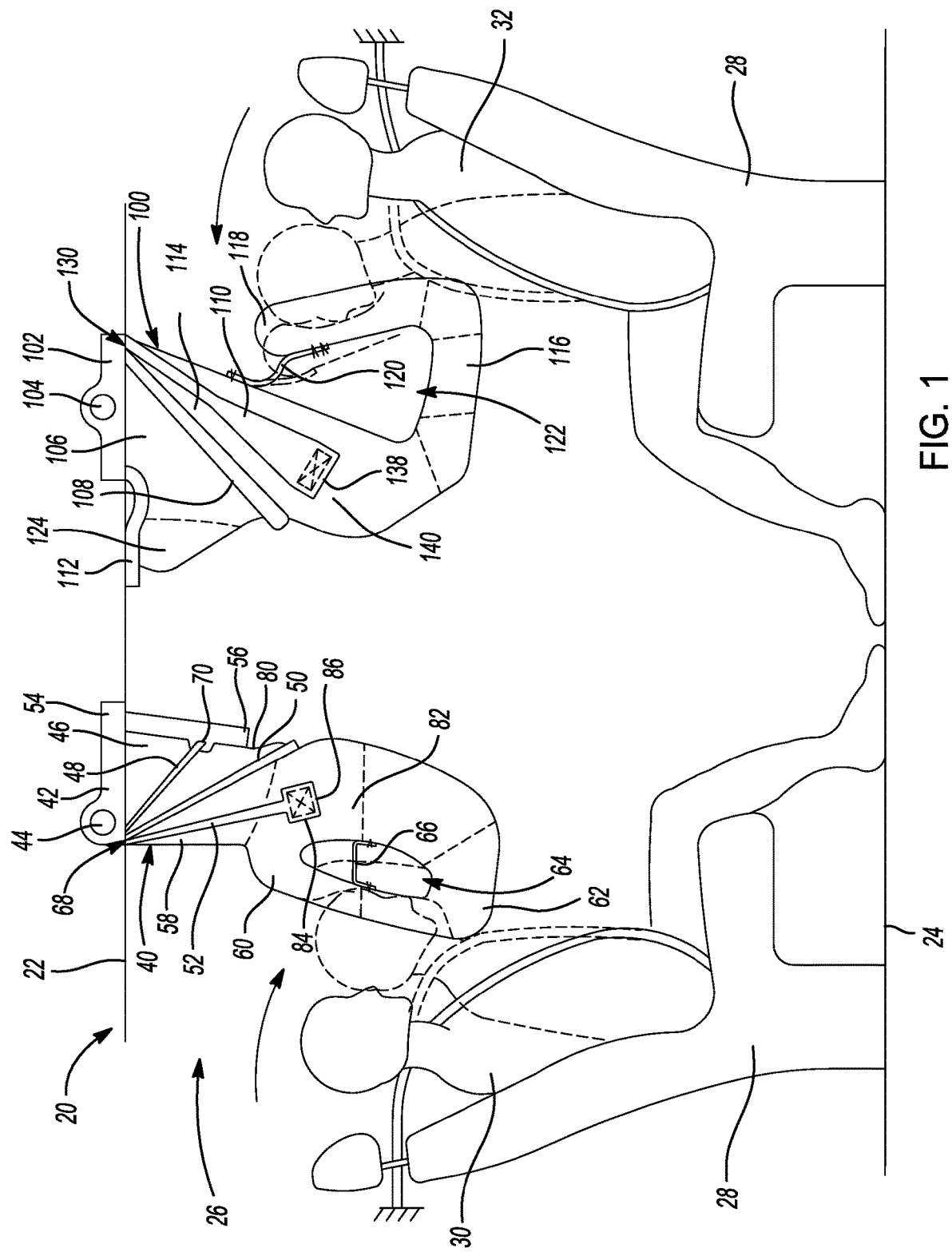
FIG. 1 is an illustration of example airbag assemblies in a vehicle in accordance with the present disclosure.

With reference now to FIG. 1, a vehicle 20 includes a roof 22 and a floor 24 defining a vehicle cabin 26. The vehicle cabin 26 includes two seats 28 and two occupants 30, 32. In this example vehicle configuration, the occupants 30, 32 are facing one another. The example airbag assemblies of the present disclosure, however, can be used in other vehicles or other environments in which the occupants 30, 32 do not face each and/or there are more or less than two occupants. In addition, the airbag assemblies of the present disclosure can be extended laterally (i.e., cross-vehicle) to cover more than one seating position. For example, the airbag assemblies of the present disclosure can be used to cover two or three laterally adjacent occupant seating positions.

Figure 6:
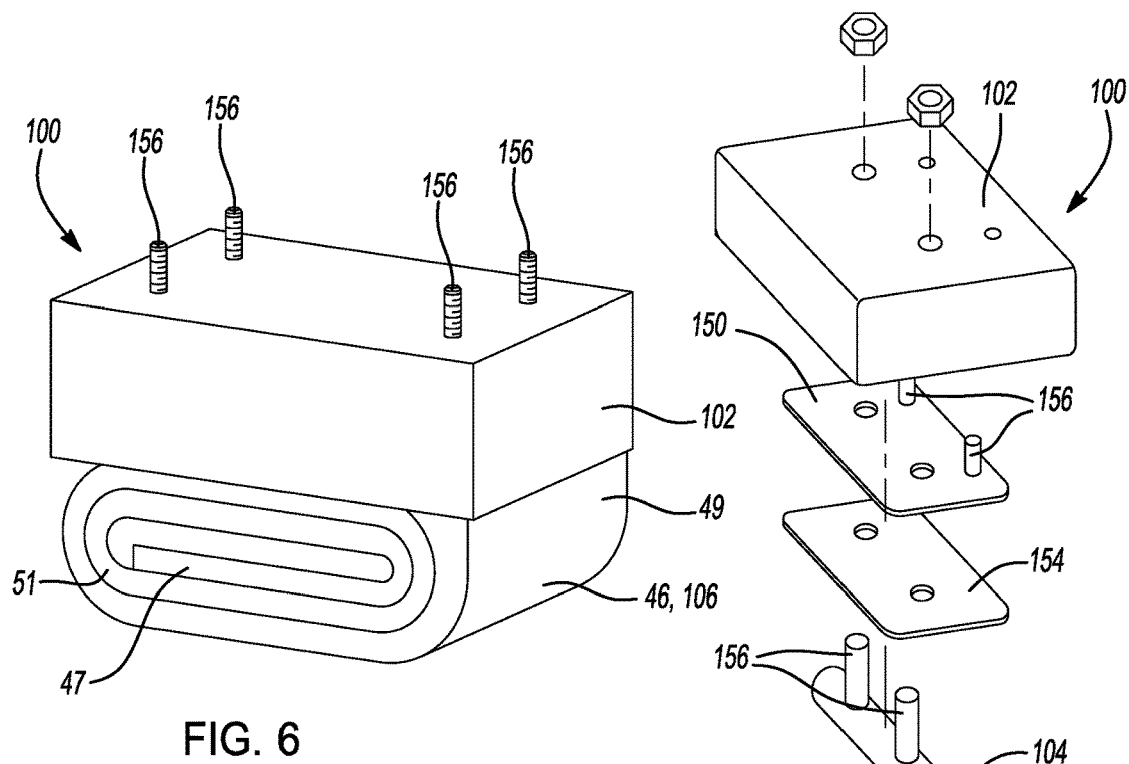
FIG. 6 is an illustration of an airbag assembly packaged for insertion into the airbag housing.

As shown, a first example airbag assembly 40 includes an airbag housing 42, an inflator 44, an airbag cushion 46, a door tether 48, a wrap tether 50 and a side tether 52. The airbag housing 42, in this example, includes a plurality of walls 54 and a door 56. The airbag housing 42 is configured such that the airbag cushion 46 can fit inside the airbag housing 42 when the airbag cushion 46 is in an uninflated state. As shown in FIG. 6, for example, the airbag cushion 46 can be folded, rolled or otherwise packaged when it is in the uninflated state and inserted into the airbag housing 42. As shown in FIG. 6, the airbag cushion 46, in one example, is configured as a roll 47 so that the initial inflating portion 49 is adjacent the occupant and the later filling rolled portion 51 is positioned on an opposite side than the initial inflating portion 49. In this manner, if the deployment of the airbag cushion 46 is partially obstructed, the airbag cushion 46 would roll out in front of the occupant and not over or behind the occupant's head. In other examples, the airbag cushion can be fully rolled or mostly rolled with some type of fold-over, tuck or accordion fold comprising part of the fold. Prior to folding the airbag cushion 46 along its length, the airbag cushion 46 can be folded laterally to coincide with a width of the airbag housing 42 with one or more accordion folds, tuck folds or roll folds.

The door 56 of the airbag housing 42 is sized to span across the walls 54 to enclose the airbag housing 42. The door 56 is attached to the walls 54 of the airbag housing 42 and can move from a closed position (not shown) to an open position as shown in FIG. 1. The door 56 can be attached via a living hinge or other mechanism such that it can move from the closed position to the open position when the airbag cushion 46 is inflated. Alternatively, the door 56 can be mounted to components adjacent to the airbag assembly 40. In other examples, an airbag assembly of the present disclosure can be mounted as a passenger airbag or a seat mounted airbag and have the door 56 positioned on the instrument panel or the seat trim, respectively. An airbag assembly that includes an inflator and an airbag cushion can be wrapped with a soft material cover with a weak region or a tear seam. In such examples, the soft material cover is the airbag housing as contemplated herein.

The inflator 44, in this example, is mounted to the airbag housing 42. The inflator 44 is in fluid communication with the airbag cushion 46. The inflator 44 can be any suitable inflator that includes a gas source that can rapidly inflate the airbag cushion 46. For example, the inflator 44 can be a pyrotechnic, compressed gas or hybrid inflator. The inflator 44 rapidly releases a gas to inflate the airbag cushion 46 in response to receiving an electronic control signal.

As shown in the example of FIG. 1, the airbag cushion 46 is in the inflated state and has projected away from the airbag housing 42 upon being inflated with gas by the inflator 44. In this example, the airbag cushion includes an extension portion 58, an upper portion 60 and a lower portion 62. The extension portion 58 is positioned adjacent and below the airbag housing 42 and contacts the door 56. The extension portion 58, the upper portion 60 and the lower portion 62 are fluidly connected to one another such that they are inflated together by the gas emitted by the inflator 44. In this example, the extension portion 58, the upper portion 60 and the lower portion 62 are joined together to form a single cavity that is filled with the gas from the inflator 44. In other examples, the airbag cushion 46 can include separate chambers joined together to form the airbag cushion 46.

The airbag cushion 46 also includes a void 64. The void 64 is created by portions of the airbag cushion 46 that are spaced apart from one another. The void 64 can have any suitable shape. In the example shown, the void 64 has an elongated rounded shape. The void 64 includes a void shaping tether 66 that can be stitched or otherwise joined to the airbag cushion 46 in the void 64. The void shaping tether 66 is joined to the airbag cushion 46 on opposite sides of the void 64 to maintain a desired size and/or shape of the void 64 when the airbag cushion 46 is in the inflated state. The void shaping tether 66 can be made of any suitable material such as a woven or non-woven fabric. The void shaping tether 66 can be made of material the same as or similar to the material used to form the airbag cushion 46. The void shaping tether 66 can also be used in conjunction with other shaping tethers as described below.

The upper portion 60 of the airbag cushion 46 is positioned at a vertical height from the floor 24 such that a head of the occupant 30 is located opposite the upper portion 60. The lower portion 62 is positioned at a vertical height from the floor 24 such that a torso of the occupant 30 is located opposite the lower portion 62. The void 64 is positioned behind (or away from the occupant 30) the upper portion 60. With this structure, the head of the occupant 30 can rotate forward relative to the torso of the occupant as the void compresses and the airbag cushion 46 pivots slightly away from the occupant 30 about its mounting location. In this manner, the forces and moment on the neck of the occupant 30 can be reduced.

To further assist in this kinematic effect, the lower portion 62 is positioned closer to the occupant 30 than the upper portion 60. This creates an angled occupant contact surface that further permits the head of the occupant 30 to rotate relative to the torso of the occupant 30 when the occupant 30 contacts the airbag cushion 46. The airbag cushion 46, including the extension portion 58, the upper portion 60 and the lower portion 62, can be made of any suitable flexible but generally non-stretchable material that reasonably resists the leakage of gas through the material so that the airbag cushion can be inflated from the uninflated state to the inflated. The material can be a woven or non-woven fabric material and can include one or more layers or one or more coatings.

As can be appreciated, the vehicle 20, in this example, does not include a rigid structure that is located behind the airbag cushion 46. As such, the airbag assembly 40, in this example, does not include an external reaction surface to support the airbag assembly 40 when the occupant 30 contacts the airbag cushion 46. Instead, the example airbag assembly 40 includes the door tether 48, the wrap tether 50 and the side tether 52. The door tether 48, the wrap tether 50 and the side tether 52 support the airbag cushion 46 and limit movement of the airbag cushion 46 in a direction away from the occupant 30 so that the airbag cushion 46 can sufficiently absorb energy when the occupant 30 contacts the airbag cushion 46. As can be further appreciated, without the door tether 48, the wrap tether 50 and/or the side tether 52, the airbag cushion 46 would significantly move away from the occupant 30 and rotate about its mounting location to the roof 22 when the occupant 30 contacts the airbag cushion 46. The door tether 48, the wrap tether 50 and/or the side tether 52 resist this movement and rotation.

The door tether 48, the wrap tether 50 and the side tether 52 can be made of any suitable flexible but generally non-stretchable material that can be attached (as will be described) and move with the airbag cushion 46 when the airbag cushion 46 inflates from the uninflated state to the inflated state. In the example shown, the door tether 48, the wrap tether 50 and the side tether 52 are made of a woven fabric material. In other examples, other non-woven or other materials can also be used.

The door tether 48, in this example, is connected to the airbag housing 42 at a first attachment point 68. The door tether 48 is also connected to the door 56 at a door attachment point 70. As shown, the first attachment point 68 is located on or near the side of the airbag housing 42 closest to the occupant 30. The door attachment point 70 is positioned on the door 56. Since the door 56 moves to the open position by rotating away from the occupant 30, the door tether 48 extends diagonally downward from the roof 22 and away from the occupant 30. When the airbag cushion 46 is in the inflated state, the door tether 48 is fully extended and significantly reduces further movement of the door 56. In the example shown, at full extension the door tether 48 positions the door 56 at an angle to the airbag housing 42. In other examples, the door 56 can be positioned vertically at full extension of the door tether 48.

Figure 2:
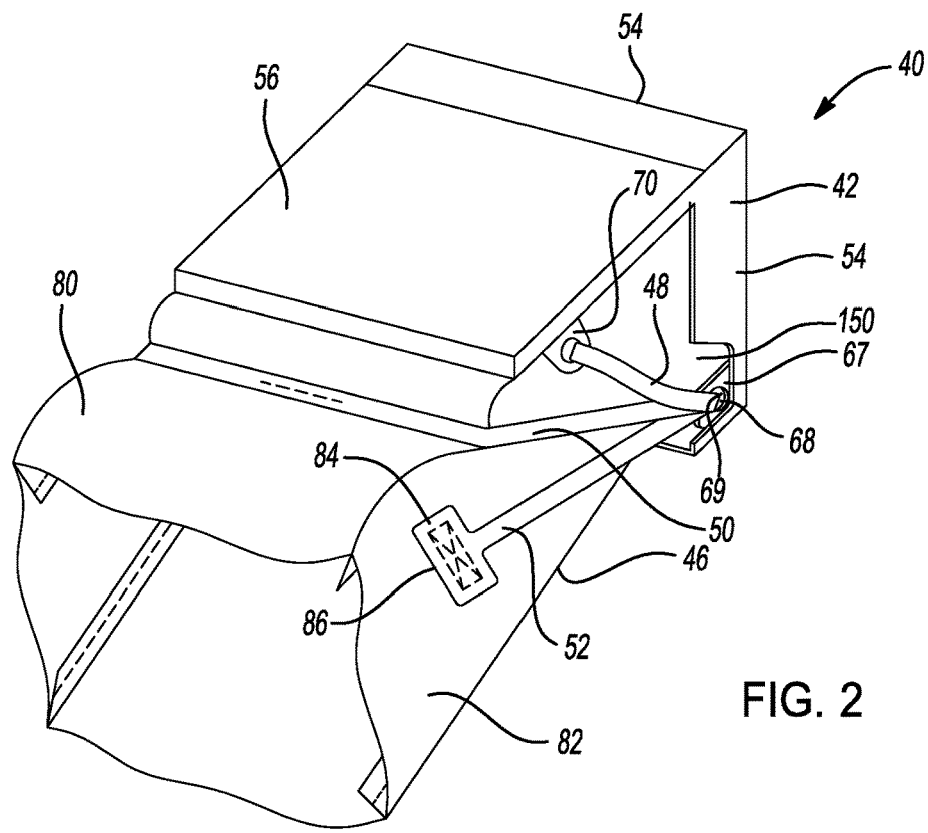
FIG. 2 is a cut-away illustration of an example airbag assembly in accordance with the present disclosure.

The first attachment point 68 can be any suitable connection for the door tether 48. As shown in FIG. 2, the first attachment point 68 can be a connector plate 67 with an opening 69. In one example, the connector plate 67 is part of the base panel 150. In other examples, such as the one shown in FIG. 3, the connector plate 67 is part of another component of the airbag assembly 40. In still other examples, the connector plate 67 and/or first attachment point 68 is directly connected to the vehicle 20. Whether directly or indirectly, the first attachment 68 is secured to the vehicle 20 so that the door tether 48, in turn, is secured to the vehicle 20. The door tether 48 can be routed through the opening 69 of the connector plate 67 and fixed thereto by stitching the door tether 48 or by using a suitable fastener, clip, or other connector.

Figure 4A:
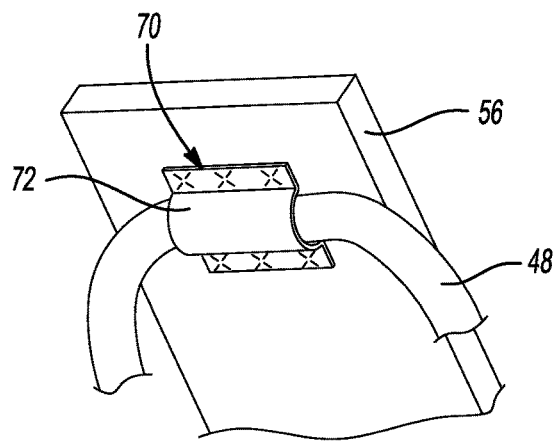
FIGS. 4A-C are illustrations of example alternative attachments of a tether to a door that can be used in airbag assemblies of the present disclosure.
Figure 4B:
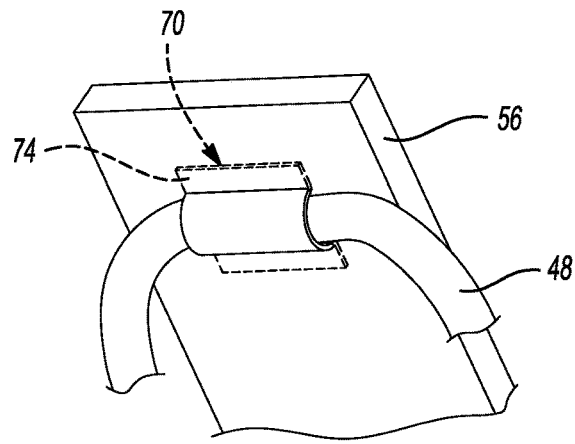
Figure 4C:
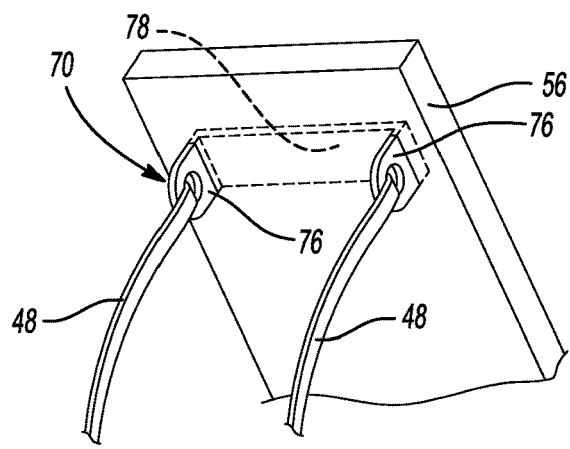

The door attachment point 70 can also be any suitable connection to secure the door tether 48. As further shown in FIG. 2, the door attachment point 70 can be a bracket mounted or otherwise secured to the door 56. Other suitable attachments can be used to secure the door tether 48 to the door 56. FIGS. 4A-C illustrate other examples of the door attachment point 70. The door attachment point 70 can be a separate bridge portion 72 that is stitched, heat staked, welded or otherwise mechanically secured to the door 56. The door tether 48 can be routed through the bridge portion 72 to secure the door tether 48 to the door 56.

In another example shown in FIG. 4B, the door attachment point 70 can include a bridge portion 74 that has a similar shape to that of bridge portion 72. In this example, the bridge portion 74 is integrally molded into the door 56. The bridge portion 74 can be made of a material different from that of the door 56. The bridge portion 74 can be inserted into a fixture or mold such that the door 56 is formed around the bridge portion 74. In other examples, the door 56 can be formed such that the bridge portion 74 is formed with the door 56.

In yet another example shown in FIG. 4C, the door attachment point 70 can include two projections 76 that extend from the door 56. The door tether 48, in this example, is connected at the two projections 76. In other examples, the door tether 48 can be a continuous length of material that is routed through both the projections 76. The projections 76 can be elements of a larger bracket 78 that is integrally formed with or molded into the door 56. In addition, the projections 76 can be separate brackets within the door 56.

In some examples of the airbag assembly 40, the door tether 48 is a single length of material that is routed through the first attachment point 68 and through the door attachment point 70. As such, the door tether 48 may be permitted to slide through the first attachment point 68 and/or the door attachment point 70. In other examples, the door tether 48 is connected at the first attachment point 68 and/or the door attachment point 70 such that the door tether 48 cannot slide through the attachment point. In either instance, the door tether 48 limits the movement of the door 56 when the airbag cushion 46 is in the inflated state. As can be seen, the extension portion 58 of the airbag cushion 46 contacts the door 56 and limits movement of the airbag cushion 46 from moving away from the occupant 30 when the occupant 30 contacts the airbag cushion 46.

The wrap tether 50 is also connected at the first attachment point 68. As previously described, the first attachment point 68 can be part of the base panel 150 or otherwise directly or indirectly connected to the vehicle 20. As shown in FIGS. 1 and 2, when the airbag cushion 46 is in the inflated state, the wrap tether 50 extends diagonally downward from the roof 22 and away from the occupant 30. The wrap tether 50 wraps around the airbag cushion 46 and connects to an attachment point located on an opposite side of the airbag assembly 40 from the first attachment point 68. The wrap tether 50, in this example, is connected to the airbag cushion 46 on a back surface 80 (i.e. the surface positioned away from the occupant 30). The wrap tether 50 is stitched to the back surface 80. In this example, the wrap tether 50 wraps around the airbag cushion 46 at a location below the door 56 and the below the door tether 48. In other examples, the wrap tether 50 can be positioned at different locations on the airbag cushion 46.

The airbag assembly 40, as shown in the example of FIGS. 1 and 2, also includes the side tether 52. The side tether 52 is a length of flexible but generally non-stretchable material that extends from the first attachment point 68 to a side surface 82 of the airbag cushion 46. As can be appreciated, a second side tether (not shown) can be positioned on the opposite side surface from side surface 82 such that the airbag assembly 40 includes two opposing side tethers 52. The side tether extends diagonally downward from the roof 22 and away from the occupant 30. In this example, the side tether 52 is attached to the airbag cushion 46 at a side attachment point 84 that is located vertically below the door tether 48 and the wrap tether 50. In other examples, the side attachment point 84 can be located at other locations on the side surface 82. In still other examples, the side tether 52 can wrap partially around the airbag cushion 46 and be attached on the back surface 80.

As further shown in FIGS. 1 and 2, the side tether 52 can include an enlarged attachment pad 86 at the side attachment point 84. The attachment pad 86 in this example is square or rectangular in shape but other configurations can also be used. In this example, the side tether 52 is stitched to the airbag cushion 46 at the side attachment point 84. The attachment pad 86 provides a large contact surface between the side tether 52 and the airbag cushion 46 so that a series of stitches can be used to securely attach the side tether 52 to the airbag cushion 46.

In the example shown, the door tether 48, the wrap tether 50, the side tether 52 and the door 56 provide reaction surfaces to limit the movement of the airbag cushion 46 in a direction away from the occupant 30. In other examples of the airbag assembly 40, various combinations of the door tether 48, the wrap tether 50, the side tether 52 and/or the door 56 can be used to limit the movement of the airbag cushion 46. In addition, multiples of the same type of tether can be used. For example, another airbag assembly 40 can use only one wrap tether 50. In another example, more than one side tethers 52 can be used. Various iterations of the previously described tethers can be used to accommodate different geometries and configurations of the vehicle cabin 26.

FIG. 1 depicts another example airbag assembly 100. In this example, the airbag assembly 100 extends downward from the roof 22 in front of the occupant 32. The airbag assembly 100 can include many similar features to that previously described with respect to the airbag assembly 40. The example airbag assembly 100, however, includes some features that are different or alternatively configured to that previously described. It should be appreciated that the features of the airbag assembly 40 and the features of the airbag assembly 100 are not mutually exclusive and that the features can be interchanged or added as may be desired according the specific needs of the vehicle environment.

The example airbag assembly 100 includes an airbag housing 102, an inflator 104, an airbag cushion 106, a wrap tether 108 and a side tether 110. The inflator 104 is positioned inside the housing 102 and is configured to inflate the airbag cushion 106 from an uninflated state to an inflated state as previously described.

The airbag housing 102, is similar to that previously described, and is configured to enclose the airbag cushion 106 when the airbag cushion 106 is in the uninflated state. The airbag housing 102 includes a door 112. The door 112 is movably connected to the airbag housing 102 such that the door 112 can move to permit the airbag cushion 106 to inflate and project downward from the airbag housing 102. The door 112 can include a living hinge and one or more breakable seams to permit the movement of the door 112 relative to the airbag housing 102. As shown in the example of FIG. 1, the door 112 can bend at or near the airbag housing 102 and flex away from the occupant 32 and toward the roof 22 when the airbag cushion 106 inflates.

The airbag cushion 106, in this example, can be constructed of a material similar to that previously described. The airbag cushion 106, in this example, projects downward from the airbag housing 106 along the extension portion 114. The airbag housing is rolled or folded back upwards at the lower portion 116 and the upper portion 118 is connected to the extension portion 114. The upper portion 118 can be connected via stitching or other suitable attachment method to the extension portion 114 with an attachment tab 120. The attachment tab 120 can be attached to a side of the upper portion 118 that is located away from the occupant 32 (as shown in FIG. 1) or to a side of the upper portion 118 that is facing the occupant 32.

The extension portion 114 is spaced apart from the upper portion 118 to create a void 122. The upper portion 118 of the airbag cushion 106 is positioned at a vertical height from the floor 24 such that a head of the occupant 32 is located opposite the upper portion 118. The lower portion 116 is positioned at a vertical height from the floor 24 such that a torso of the occupant 32 is located opposite the lower portion 116. The void 122 is positioned behind (or away from the occupant 32) the upper portion 118. With this structure, the head of the occupant 32 can rotate forward relative to the torso of the occupant as the void compresses and the airbag assembly 100 pivots slightly away from the occupant 32 around its mounting location at the roof 22. In this manner, the forces and moment on the neck of the occupant 32 can be reduced.

To further assist in this kinematic effect, the lower portion 116 is positioned closer to the occupant 32 than the upper portion 118. This creates an angled occupant contact surface that further permits the head of the occupant 32 to rotate relative to the torso of the occupant 32 when the occupant 32 contacts the airbag cushion 106.

Figure 3:
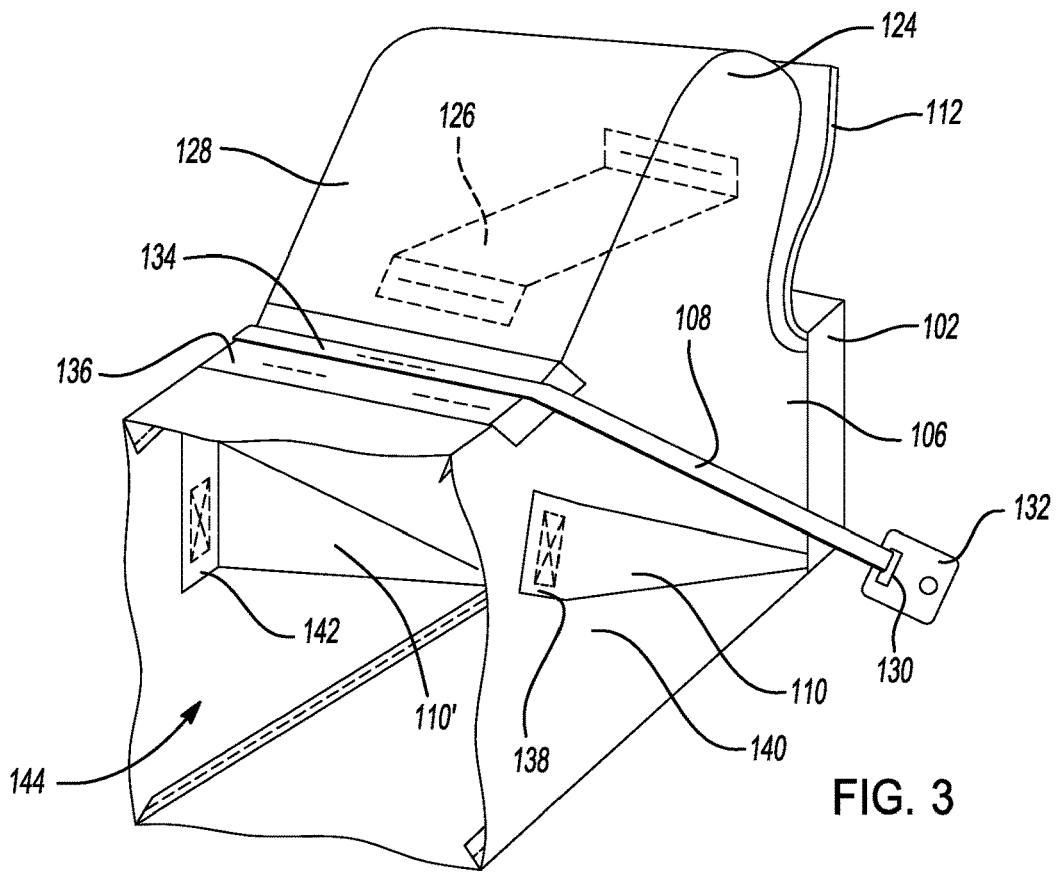
FIG. 3 is a cut-away illustration of another example airbag assembly in accordance with the present disclosure.

As shown in the example of FIGS. 1 and 3, the airbag cushion 106 includes an optional reaction foot 124. The reaction foot 124 is a portion of the airbag cushion 106 that projects away from the occupant 32 at or near the roof 22. In this example, the reaction foot 124 is an integral part of the airbag cushion and is formed of the same material as the other regions of the airbag cushion 106 (i.e., the extension portion 114, the lower portion 116 and the upper portion 118). In other examples, the reaction foot 124 can be a separate chamber or formed from a separate piece (or pieces) of material that is attached to the airbag cushion 106.

The reaction foot 124 is fluidly connected to a central chamber of the airbag cushion 106 such that the reaction foot 124 inflates along with the airbag cushion 106. When the airbag cushion 106 is in the inflated state, the reaction foot 124 projects away from the occupant and, in this example, contacts the roof 22 to limit the movement of the airbag cushion 106 in a direction away from the occupant 32. In the example shown, the reaction foot 124 indirectly contacts the roof 22 since the door 112 is positioned between the reaction foot 124 and the roof 22 when the airbag cushion 106 is in the inflated state. In other examples, the reaction foot 124 can be positioned directly adjacent the roof 22 or can be supported (directly or indirectly) by another structure in the vehicle cabin 26 such as a support pillar, an overhead storage compartment, console, or the like.

As shown in FIG. 3, the airbag cushion 106 can include a foot tether 126. The foot tether 126 is a length of flexible but generally non-stretchable material that limits the movement of the reaction foot 124 or causes the reaction foot 124 to maintain a desired shape. In this example, the foot tether 126 is a rectangular piece of flexible but generally non-stretchable material stitched to the portion of the reaction foot 124 adjacent to the door 112 and to a back wall 128 of the airbag cushion 106. The foot tether 126 is positioned inside the reaction foot 124 and/or the airbag cushion 106. In other examples, the foot tether 126 can be connected at other locations and/or positioned externally to the reaction foot 124. In addition, the foot tether 126 can be connected to the airbag cushion 106 using other suitable methods of attachment such as by weaving the foot tether 126 into the airbag cushion 106.

The airbag cushion 106, in the example shown, includes the wrap tether 108 and the side tether 110 in addition to the reaction foot 124 to limit the movement of the airbag cushion 106 in a direction away from the occupant 32. The wrap tether 108 is similar to the wrap tether 50 previously described in that it is an elongated piece of flexible but generally non-stretchable material that is connected at a first attachment point 130 and wraps around the airbag cushion 106. As shown in FIG. 1, the first attachment point 130 may be positioned on the airbag housing 102. Alternatively, as shown in FIG. 3, the first attachment point 130 may be positioned externally to the airbag housing 102. As shown, the wrap tether 108 is connected to a connector plate 132. The connector plate 132, in this example, is a steel member with an opening for accepting the wrap tether 108. The wrap tether 108 can be connected to the connector plate 132, for example, by looping the wrap tether 108 through the opening and stitching (or otherwise connecting) the wrap tether 108 to itself to form a loop. The connector plate 132 can be welded, bolted or otherwise connected to a structural member of the vehicle 20 such as a roof rail, roof structure, pillar or the like. Any other tether attachment points described herein can use a similar attachment as that shown and described with respect to the wrap tether 108 and the connector plate 132.

The wrap tether 108, in the example shown, wraps around the back wall 128 of the airbag cushion 106 and is connected to an attachment point located on the opposite side of the airbag cushion 106 from the first attachment point 130. The wrap tether 108 can also be connected (via stitching, adhesive, or other suitable method) to the airbag cushion 106 at the back wall 128. In the example shown, a back seam 134 connects the wrap tether 108 to the airbag cushion 106. As further shown in FIG. 3, a back reinforcement 136 is positioned, in this example, between the wrap tether 108 and the back wall 128 of the airbag cushion 106. The back reinforcement 136 is a flexible panel of material connected to the airbag cushion 106 at a location where the wrap tether 108 contacts or is attached to the airbag cushion 106. The back reinforcement 136 can stiffen the airbag cushion 106 at a localized portion of the airbag cushion. The back reinforcement 136 can also distribute the forces transmitted between the wrap tether 108 and the airbag cushion 106. The distribution of forces can prevent localized ripping or tearing of the airbag cushion and assist in limiting the airbag cushion 106 from moving away from the occupant 32.

The airbag assembly 100, in the example shown, also includes the side tether 110. The side tether 110 can be similar to the side tether 52 previously described. In this example, the side tether 110 is a length of flexible but generally non-stretchable material. The side tether 110 is attached at the first attachment point 130 and extends to a side attachment point 138 on a side surface 140 of the airbag cushion 106. In one example shown in FIG. 3, the side tether 110 widens between the first attachment point 130 and the side attachment point 138. As such, the side tether includes an enlarged footprint at the side attachment point 138. The enlarged footprint distributes the forces at the side attachment point 138 over a larger surface area to prevent ripping, tearing or other failures at the side attachment point 138.

As shown in FIG. 3, the side tether 110 is positioned on an outside surface of the airbag cushion 106. The airbag assembly 100 can also include a side reinforcement 142 positioned on an inside surface 144 of the airbag cushion 106. The side reinforcement 142 is a panel of material positioned on the inside surface of the airbag cushion 106 at the side attachment point 138. The side tether 110 can be connected to the airbag cushion 106 by stitching the side tether 110 through the airbag cushion 106 and through the side reinforcement 142 as shown. In this manner, the side reinforcement can provide added stiffness to the airbag cushion 106 and/or prevent ripping, tearing or other failure at the side attachment point 138. The side reinforcement 142 can extend along an inner surface of the airbag cushion 106 toward the airbag housing 102 as shown. In other examples, the side tether 110 can be positioned inside the airbag cushion 106 (rather than on the external surface of the side surface 140 as shown) and have a similar shape and configuration as that shown for the side reinforcement 142.

Figure 5:
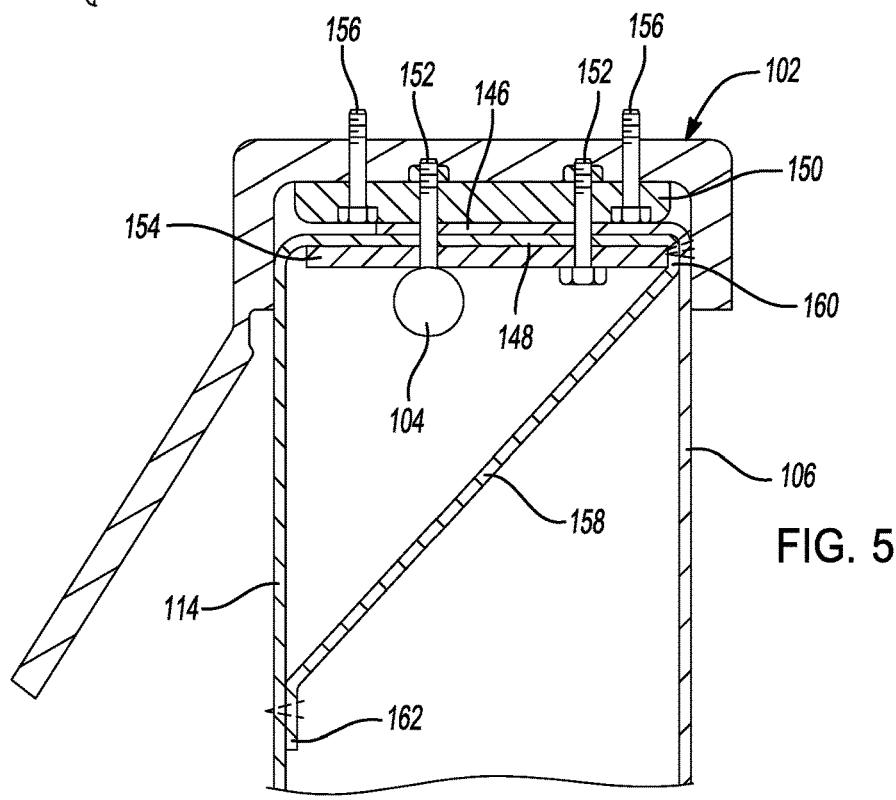
FIG. 5 is a sectional view of an example airbag assembly of the present disclosure showing an internal tether and the attachment of an airbag cushion to an airbag housing.

As shown in FIG. 5, the airbag cushion 106 (or the airbag cushion 46) is connected to the airbag housing 102, in this example, by securing one or more flaps on the airbag cushion 106 to the airbag housing 102. As shown, the airbag cushion 106 includes a first flap 146 and a second flap 148. The first flap 146 and the second flap 148 are connected to the base panel 150 of the airbag housing 102. Any suitable method of attachment can be used. In this example, two fasteners 152 are inserted through a mounting plate 154, the first flap 146 and the second flap 148 and secured to the base panel 150. The first flap 146 and the second flap 148 are secured in position between the base panel 150 and the mounting plate 154. In other examples, the airbag cushion 106 can be connected to the airbag housing 102 without the mounting plate 154. As shown in FIG. 5, the inflator 104 is secured to one of the fasteners 152 such that the inflator 104 is positioned inside the central chamber of the airbag cushion 106. In this position, the inflator 104 can emit a gas to inflate the airbag cushion 106 from the uninflated state to the inflated state.

The airbag housing 102 can include one or more mounting studs 156. In the example shown in FIG. 6, the airbag housing 102 includes four mounting studs 156 that project away from the airbag housing 102. The airbag housing can then be secured at a desired location in the vehicle 20 (such as to the roof 22) by inserting the mounting studs 156 into a support structure of the vehicle 20 and securing the mounting studs 156 to the support structure.

Referring back to FIG. 5, the airbag cushion 106, in this example, includes an angled internal tether 158. The angled internal tether 158 is a thin piece of flexible but generally non-stretchable material sewn or otherwise attached to the airbag cushion 106. The internal tether 158, in this example, is attached to the airbag cushion 106 at a first end 160 and at a second end 162. The first end 160 is positioned at or near the airbag housing 102 (either adjacent to or not adjacent to the mounting plate 154) and the second end 162 is positioned below the first end 160 on an opposite internal side of the airbag cushion 106. As such, the internal tether 158 extends diagonally across the airbag cushion 106. The internal tether 158 can maintain a desired shape of the airbag cushion 106 at the extension portion 114 of the airbag cushion 106 in the region where the airbag cushion inflates out from the airbag housing 102. In other examples, the airbag cushion 106 can include more than one internal tether 158 and/or other internal tethers with different shapes, sizes or attachment locations to shape or limit movement of the airbag cushion 106.

Figure 7A:
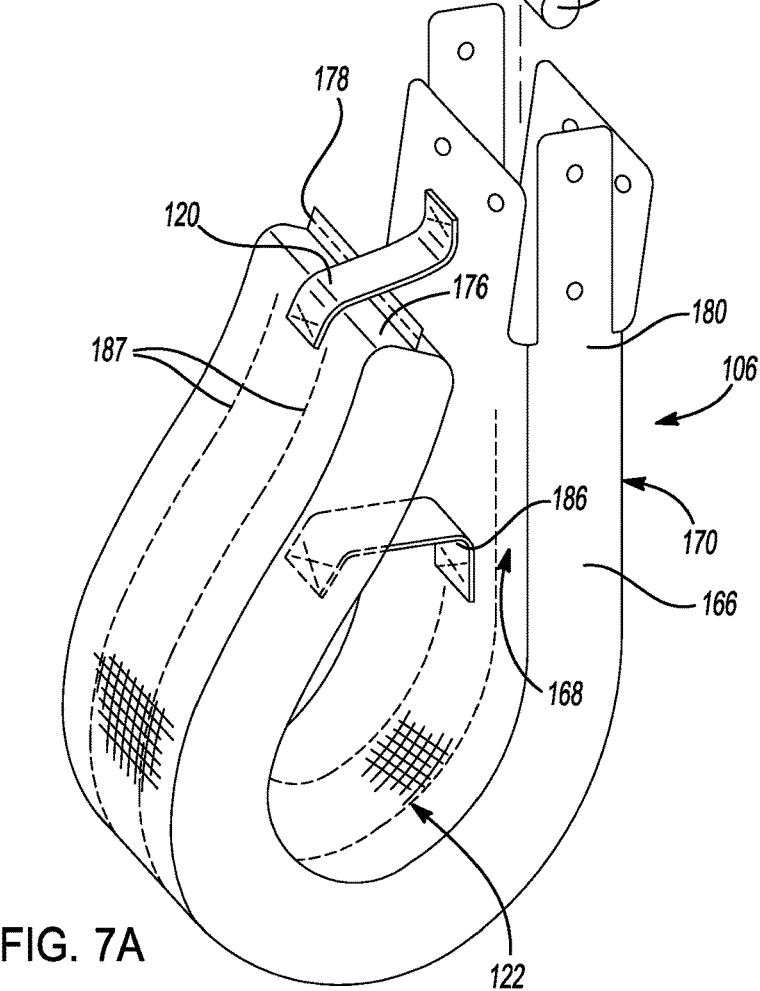
FIG. 7A is an exploded view of an example airbag assembly in accordance with the present disclosure.
Figure 8:
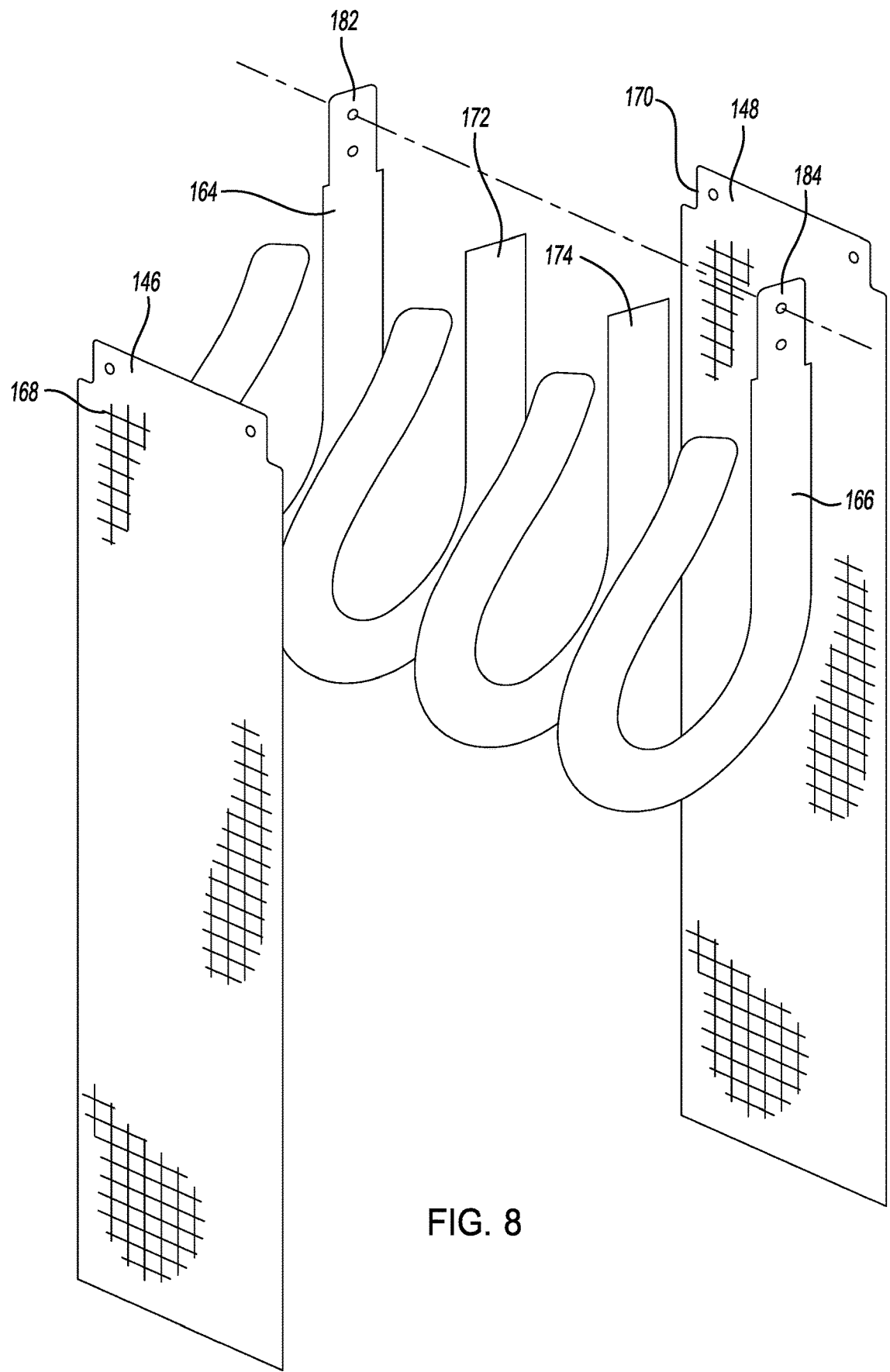
FIG. 8 is an exploded view of an example structure of the airbag cushion of FIG. 7A.

As shown in FIGS. 7A and 8, the airbag cushion 106 can be constructed of multiple panels sewn or otherwise joined together. In one example, the airbag cushion 106 includes a first side panel 164, a second side panel 166, a first face panel 168, a second face panel 170, a first separator panel 172 and a second separator panel 174. The longitudinal edges of the first side panel 164 and the second side panel 166 are joined to the longitudinal edges of the first face panel 168 and the second face panel 170 to form the airbag cushion 106. The longitudinal edges can be sewn together at seams that can be positioned inside (or outside) the central chamber of the airbag cushion 106. The first side panel 164 and the second side panel 166, in this example, have a curved or J-shape. When the first face panel 168 and the second face panel 170 are joined to the first side panel 164 and the second side panel 166, the resulting airbag cushion has the same curved or J-shaped profile as the first side panel 164 and the second side panel 166. At a terminal end 176 of the airbag cushion 106, the lateral edges of the first face panel 168 and the second face panel 170 are joined together at terminal seam 178 to close the airbag cushion 106 at the terminal end 176.

At the connecting end 180 of the airbag cushion 106, the airbag cushion includes the first flap 146, the second flap 148, a third flap 182 and a fourth flap 184. Once the inflator 104 and the mounting plate 154 have been inserted into the airbag cushion 106, the first flap 146, the second flap 148, the third flap 182 and the fourth flap 184 are folded in an overlapping manner inwardly such that the openings in the flaps align. As such, fasteners, studs 156 or other connecting members can be inserted through the aligned holes in the mounting plate 154, the flaps 146, 148, 182, 184 and the base panel 150 to connect the airbag cushion 106 to the airbag housing 102.

The airbag cushion 106 also includes the first separator panel 172 and the second separator panel 174. The first separator panel 172 and the second separator panel 174, in this example, are connected inside the airbag cushion 106 between the first side panel 164 and the second side panel 166 to create longitudinal chambers inside the central chamber of the airbag cushion 106. As can be appreciated, the first separator panel 172 and the second separator panel 174 are stitched along longitudinal seams 187 inside the airbag cushion 106. In the example shown, the airbag cushion 106 includes two separator panels. In other examples, the airbag cushion can include more or less than two separator panels to create more or less than three longitudinal chambers inside the airbag cushion 106.

The longitudinal chambers created by the first separator panel 172 and the second separator panel 174 can help to evenly distribute the gas inside the airbag cushion 106. Additionally, the first separator panel 172 and the second separator panel 174 assist in maintaining the shape and contour of the airbag cushion 106. As described above, the first separator panel 172 and the second separator panel 174 have a curved or J-shape as shown in FIG. 8. In other examples, the first separator panel 172, the second separator panel 174, the first side panel 164 and the second side panel 166 can have substantially rectangular or elongated shapes without the curved profile as shown. In such examples, the panels are joined together to form an airbag cushion with a rectangular profile. The rectangular-shaped airbag cushion 106 can then be rolled or folded to have the curved or J-shape as shown in FIG. 7A.

As further shown in FIG. 7A, the airbag cushion 106 can include the attachment tab 120 that connects the terminal end 176 to the extension portion 114 of the airbag cushion 106. In addition, the airbag cushion 106 includes a shaping tether 186 that is connected inside the void 122 to maintain the desired curved shape of the airbag cushion 106 when the airbag cushion 106 is in the inflated state. The shaping tether 186 is a flexible but generally non-stretchable piece of material stitched or otherwise connected to opposing surfaces of the first face panel 168 inside the void 122. In this example, the shaping tether 186 is a rectangular piece of material. In other examples, the airbag cushion 106 can include more than one shaping tether 186 and/or shaping tethers 186 of different shapes and configurations.

Figure 7B:
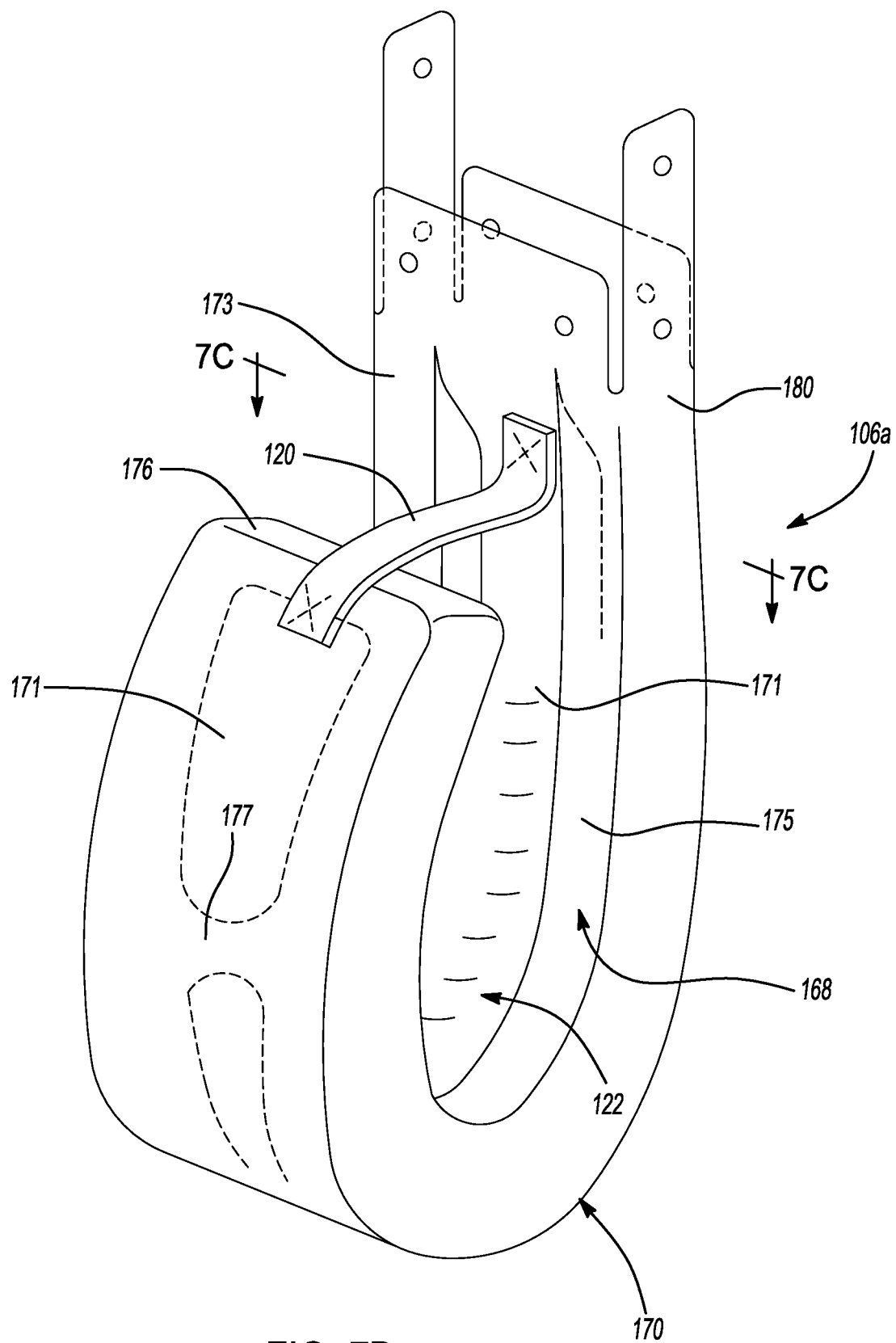
FIG. 7B is a view of the example airbag assembly of FIG. 7A with an example alternate cross-sectional profile.
Figure 7C:
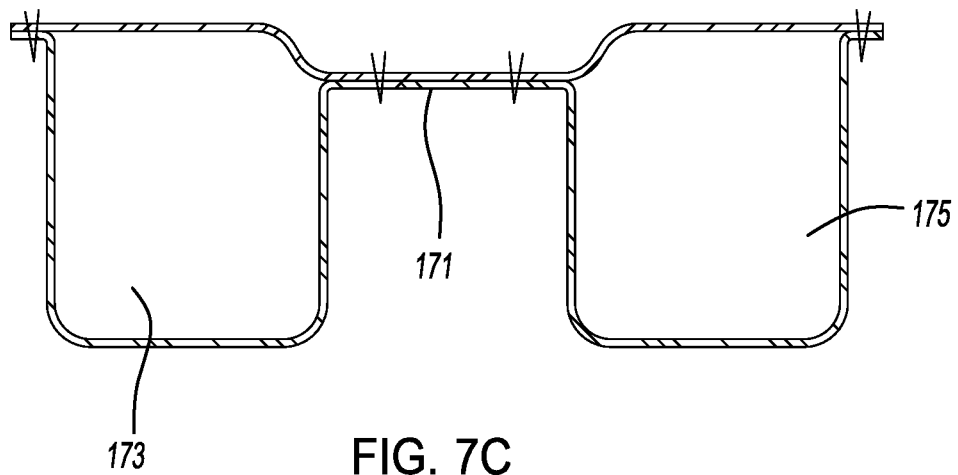
FIG. 7C is a cross-sectional view of an example profile of the airbag of FIG. 7B.
Figure 7D:
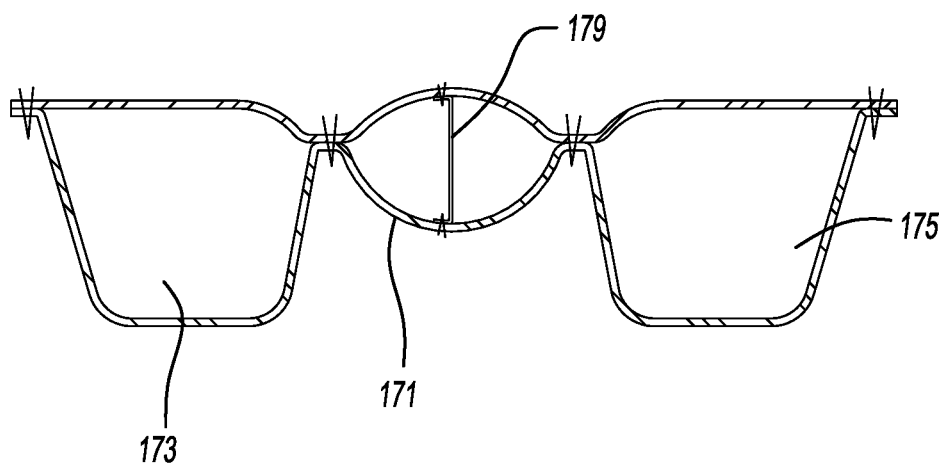
FIG. 7D is a cross-sectional view of another example profile of the airbag of FIG. 7B.

As shown in FIG. 7B, the airbag cushion 106a can have an alternate cross-sectional profile. The airbag cushion 106a, in one alternate example, has two recessed portions 171 that are positioned between a first side longitudinal chamber 173 and a second side longitudinal chamber 175. The recessed portions 171 are inset from the first side longitudinal chamber 173 and the second side longitudinal chamber 175. This example airbag cushion 106a includes a first face panel 168 and a second face panel 170. The first face panel 168 and the second face panel 170 can be tethered, stitched or woven to create the cross-sectional profile as shown. The first face panel 168 can be spaced apart from the second side face panel 170 and be filled with gas after the airbag cushion 106a inflates. The first face panel 168 can, alternatively, contact the second face panel 170 such that the first panel 168 is not spaced apart from the second face panel 170. The airbag cushion 106a can also include a rib 177 or multiple ribs. The number of ribs affects the number of recessed portions. The rib 177 can connect between the first side longitudinal chamber 173 and the second side longitudinal chamber 175 at or near the location where an occupant's head contacts the airbag cushion 106a. Depending on how the first face panel 168 and the second face panel 170 are attached to each other, the recessed portion 171 may not be inflated as shown in FIG. 7C. In another example, the recessed portion may be inflated to a reduced thickness as shown in FIG. 7D. An optional tether 179 can be used to control the inflated thickness of the recessed portion 171. Likewise, similar tethers can be used between the recessed portion 171 and the first side longitudinal chamber 173 and the second side longitudinal chamber 175. In still other examples, the recessed portion 171 can be divided into multiple chamber positioned side-by-side. For instance, for a two chamber construction, tether 179 shown in FIG. 7D can be replaced with stitching between two outer walls.

As shown, the airbag cushion 106a can have a side view shape and/or profile similar to that shown in FIG. 7A. The airbag cushion 106a, in this example, has a curved or rounded side profile shape similar to the letter "J." The terminal end 176 of the airbag cushion is attached to the recessed portion 171 at or near the connecting end 180 with the attachment tab 120. The attachment tab 120 helps to create the void 122, as previously described. With the shape as shown in FIG. 7B, the airbag cushion 106a has an internal volume that is less than the interior volume of the airbag cushion 106 shown in FIG. 7A. Since the airbag cushion 106a has a smaller interior volume, the airbag cushion 106a can inflate to the inflated state more quickly that the airbag cushion 106 shown in FIG. 7A or can use a smaller, less heavy inflator with less gas output.

Figure 9:
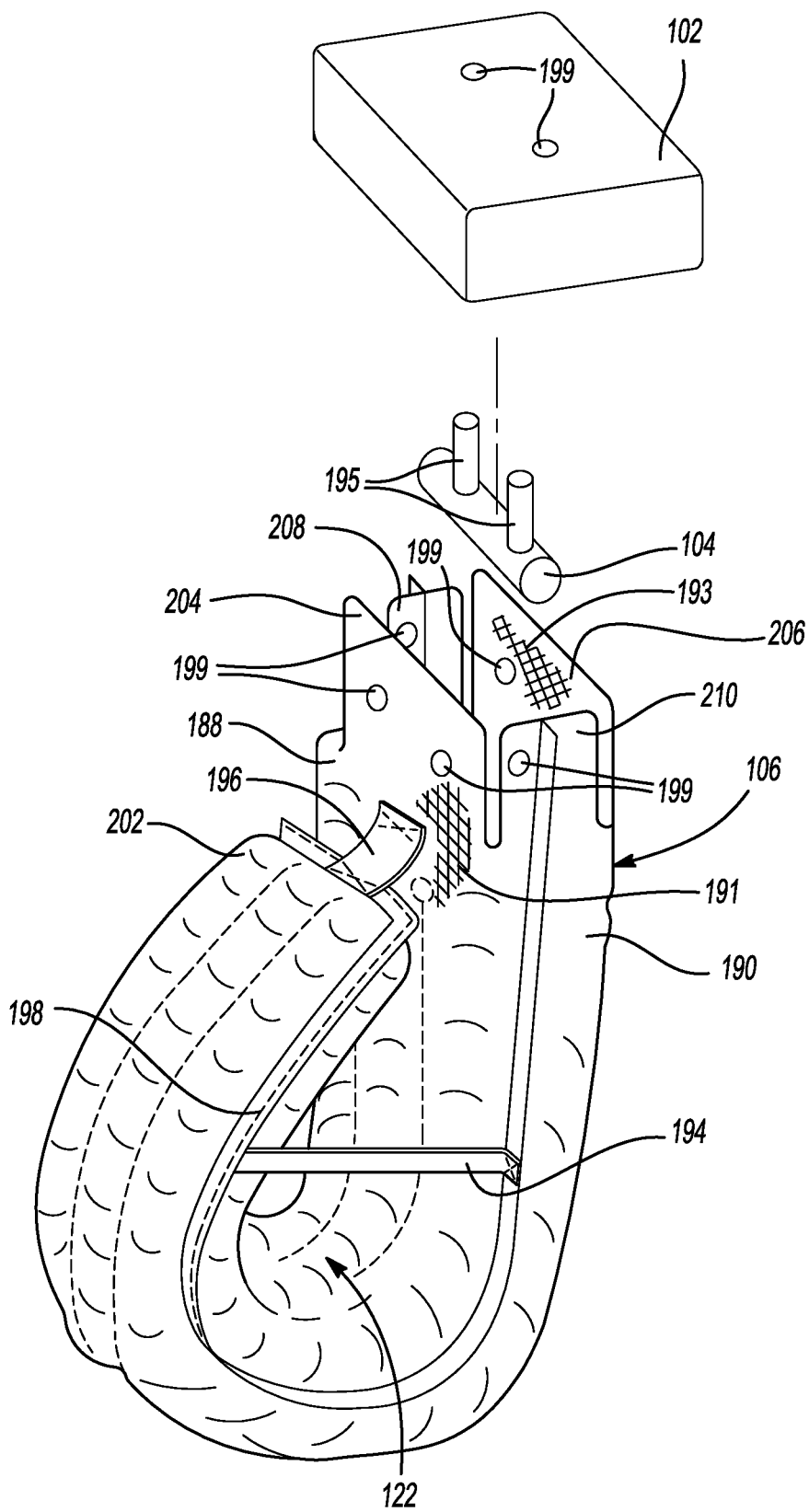
FIG. 9 is an exploded view of another example airbag assembly in accordance with the present disclosure.

As shown in FIGS. 9 and 10, another example construction of the airbag cushion 106 is shown. The geometry of the airbag cushion 106 is similar to that previously described. In this example, however, the airbag cushion 106 includes a first panel 188, a second panel 190, a first cross tether 192, a second cross tether 194 and an end tether 196. The airbag cushion 106 is constructed by stitching or otherwise connecting the first panel 188 to the second panel 190 around a periphery of the panels at a peripheral seam 198. The first panel 188 is also connected to the second panel 190 along one or more longitudinal seams 200. As an optional construction (not shown), the first panel 188 and the second panel 190 can be made of the same panel of material if the material is folded over on itself. The longitudinal seams 200 are positioned between the side edges of the first panel 188 and the second panel 190 and inside the peripheral seam 198. The longitudinal seams 200 can terminate with a circular sewing pattern to reduce localized stresses when inflated. As shown in FIG. 9, the longitudinal seams 200 partition the airbag cushion 106 into one or more longitudinal chambers when the airbag cushion inflates to the inflated state. As shown, the airbag cushion 106, in this example, is partitioned into three longitudinal chambers by two longitudinal seams 200. In other examples, more than (or less than) two longitudinal seams can be included to partition the airbag cushion into more than (or less than) three longitudinal chambers.

Similarly to example previously described, the airbag cushion 106 is folded and/or rolled so that a terminal end 202 of the airbag cushion 106 is placed at or near a series of flaps at the opposite end of the airbag cushion 106. The end tether 196 is stitched or otherwise attached to a portion of the airbag cushion near the first flap 204, the second flap 206, the third flap 208 and the fourth flap 210. This forms a rounded shape (or J-shape) of the airbag cushion 106 with the void 122. The first cross tether 192 and the second cross tether 194 are attached across the void 122. The end tether 196, the first cross tether 192 and the second cross tether 194 retain the airbag cushion 106 into the rounded and/or folded shape with the void 122. The airbag cushion 106 can also optionally include a shaping tether (such as shaping tether 186 shown in FIG. 7A).

The airbag cushion 106 can also include one or more panels that have fabric with a weave direction that assists the airbag cushion 106 to have the curved, rounded and/or folded shape as shown. For example, the first panel 188 includes a first weave direction 191 that is oriented with fibers in longitudinal and perpendicular directions relative to the side edges. The second panel 190, in this example, includes a second weave direction 193 that includes fibers oriented at a 45 degree angle relative to the first weave direction. With such orientations, the first panel 188 is limited from stretching in the longitudinal direction due to the first weave direction 191. The second panel 190, in comparison, is permitted to stretch in the longitudinal direction. Such relative weave orientations can assist the airbag cushion 106 to form into the curved, rounded and/or folded shape when the airbag cushion 106 inflates.

The inflator 104 can be inserted into the airbag cushion 106 so that the studs 195 protrude through the holes 197 and then the studs 195 can be passed through the holes 199 in the airbag housing 102. In this manner, the inflator 104 and associated studs 195 hold the airbag cushion 106 into the airbag housing 102 and the base panel 150 is not used. As previously described, this example airbag cushion 106 can be rolled and or folded and inserted into the airbag housing 102. The airbag cushion 106 can be secured to the airbag housing 102 by one or more fasteners (not shown in FIG. 9) that are inserted through the opening in the first flap 204, the second flap 206, the third flap 208 and the fourth flap 210. The fasteners secure the flaps, the inflator 104 and the mounting plate 154 inside the airbag housing 102.

The example airbag cushions 46, 106, as previously described, are stitched or otherwise connected together to create the structures as shown. In other examples, the airbag cushions can be woven together. For example, the first side panel 164, the second side panel 166, the first face panel 168, the second face panel 170, the first separator panel 172 and/or the second separator panel 174 can be woven together out of a woven material during manufacture rather than being separately made and then connected together. Similarly, the first panel 188 and the second panel 190 can be woven together as a single component out of a woven material rather than being created separately and then stitched together. In still other examples, a combination of woven panels and separately connected panels can be used to create the airbag cushions 106 previously described.

In other examples, the airbag cushions 46, 106 can include other shapes, configurations and/or tethers. As shown in FIG. 11, an example airbag cushion 212 can include a corner tether 214. The corner tether 214 is a rectangular piece of flexible but generally non-stretchable material connected inside the void 216 of the airbag cushion 212. The corner tether 214 limits the movement of the airbag cushion 212 when the airbag cushion inflates to maintain a desired shape of the airbag cushion 212.

As shown in FIG. 12, another example airbag cushion 218 can include a leg 220. The leg 220 is a portion of the airbag cushion 218 that projects downward from the bottom curved portion of the airbag cushion 218. The leg 220 can be directed toward or away from an occupant 30, 32. For example, the leg 220 can be directed downward from the airbag cushion 218 and provide a lower contact surface for an occupant's torso.

Figure 13:
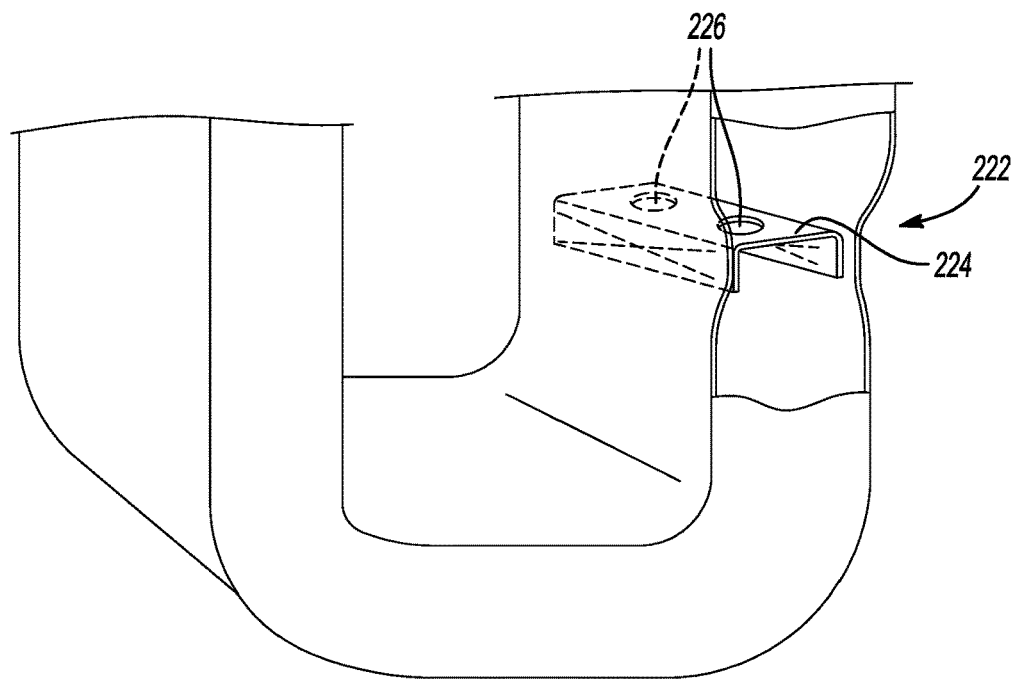
FIG. 13 is a cut-away illustration showing an example shaping tether.
Figure 14:
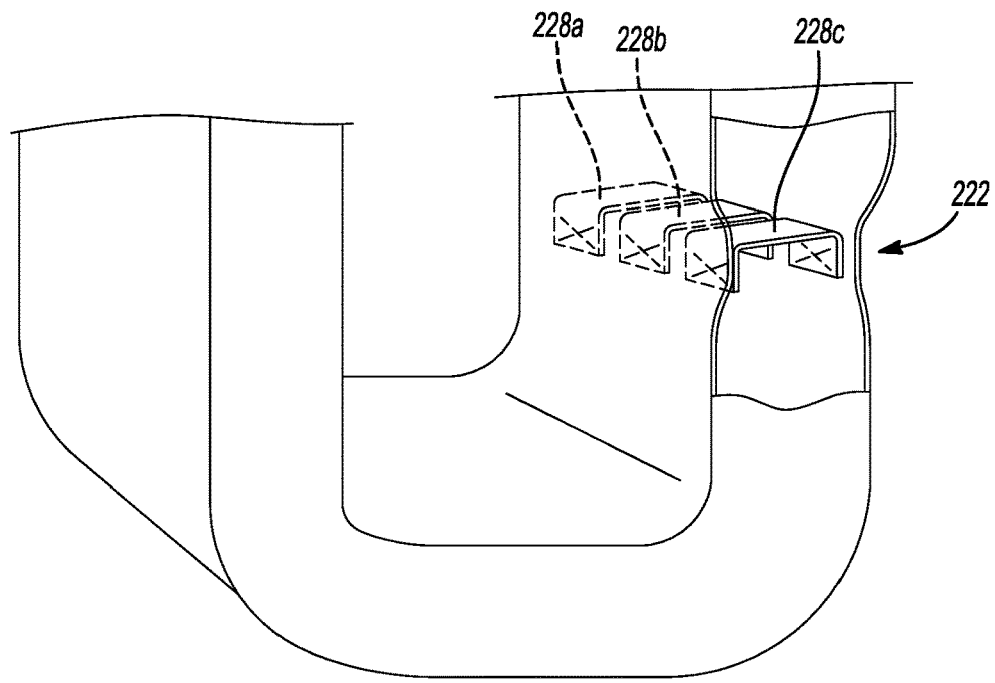
FIG. 14 is a cut-away illustration showing another example shaping tether.

As shown in FIGS. 13 and 14, another example airbag cushion 222 can include an internal shaping tether 224. The internal shaping tether 224 can span across the internal cavity of the airbag cushion 222 and be connected to the internal surface of opposing side walls. In such an example, the internal shaping tether 224 includes one or more apertures 226. The apertures 226 permit gas to flow through the internal shaping tether 224 to permit the airbag cushion 222 to inflate. In another example, as shown in FIG. 14, the airbag cushion 222 can include a series of internal shaping tethers 228a-c. The Internal shaping tethers 228 are spaced apart from one another to permit gas to flow between the internal shaping tethers 228. The internal shaping tethers 224, 228 maintain a desired distance between opposing walls of the airbag cushion 222 to maintain a desired shape of the airbag cushion 222.

Figure 15:
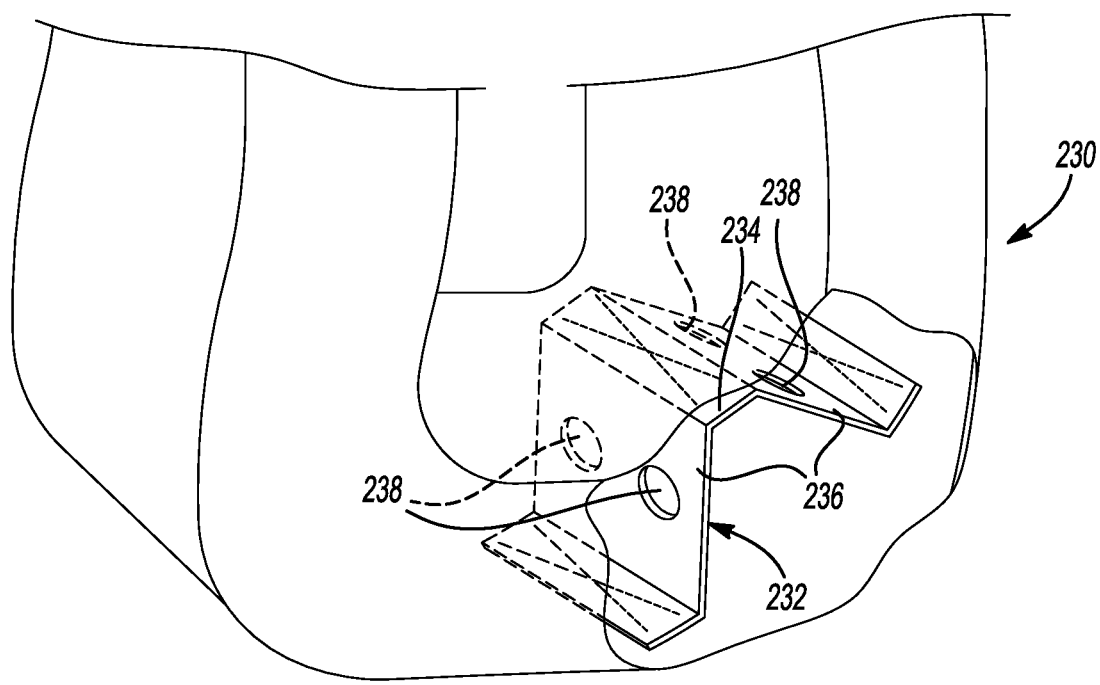
FIG. 15 is a cut-away illustration showing another example shaping tether.
Figure 16:
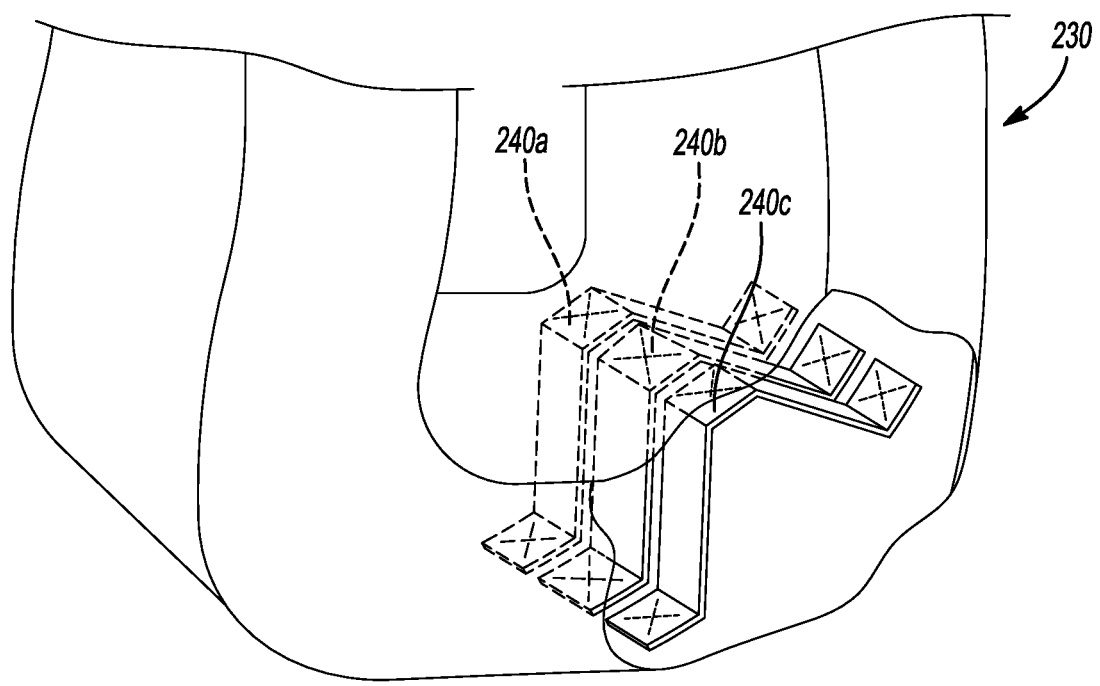
FIG. 16 is a cut-away illustration showing another example shaping tether.

As shown in FIGS. 15 and 16, still another example airbag cushion 230 can include a bend tether 232. The bend tether 232 is a flexible but generally non-stretchable piece of material that has two angled portions 236 that form an inverted V-shape. An apex 234 of the bend tether 232 is connected to one side of the airbag cushion 230 and the opposite ends of the angled portions 236 are connected to the opposite side of the airbag cushion 230 at or around a bend in the airbag cushion 230. In this manner, the bend tether 232 can maintain a bend, a corner or other shape of the airbag cushion 230.

In one example, the bend tether 232 is a single rectangular piece of material that is shaped and connected inside the airbag cushion 230. In such an example, the bend tether 232 can include one or more apertures 238 that permit gas to flow through the bend tether 232. In another example, as shown in FIG. 16, a series of bend tethers 240a-c, can be connected inside the airbag cushion 230. The bend tethers 240 are spaced apart from one another inside the airbag cushion 230 to permit gas to flow between the bend tethers 240 when the airbag cushion is inflating. In the example shown, the airbag cushion 230 includes three bend tethers 240. In other examples, more or less than three bend tethers 240 can be used to maintain a desired shape of the airbag cushion 230.

Figure 17:
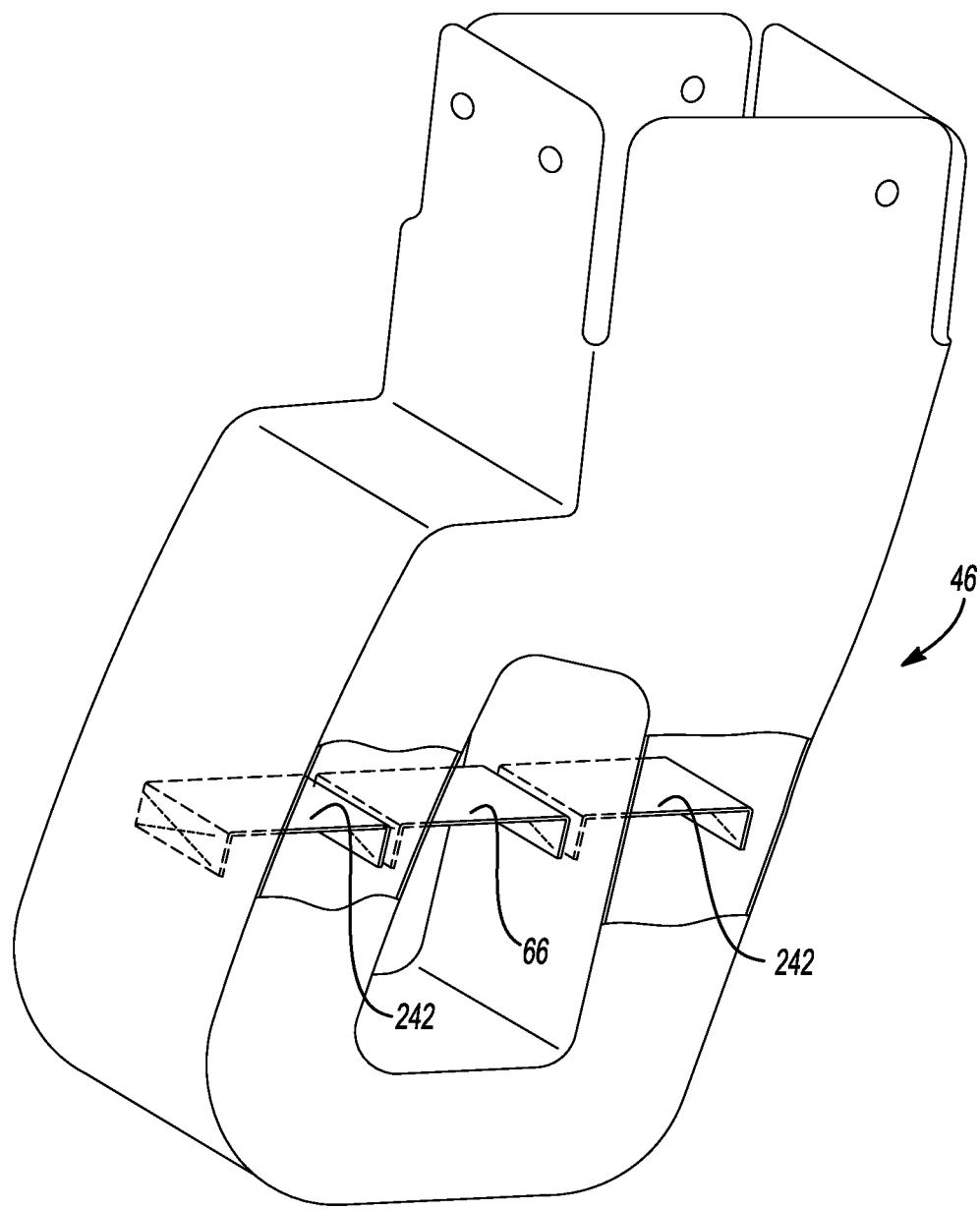
FIG. 17 is a cut-away illustration showing another example shaping tether.

FIG. 17 shows another example of the airbag cushion 46. As previously described, the airbag cushion 46 includes the void shaping tether 66. As shown, the airbag cushion 46 can also include one or more internal shaping tethers 242. In this example, the void shaping tether 66 and the pair of internal shaping tethers 242 are positioned in substantially the same horizontal plane in the airbag cushion 46. In other examples, the void shaping tether 66 and the internal shaping tethers 242 can be positioned in different planes or can be arranged at angles relative to one another. Various void shaping tethers 66 and internal shaping tethers 242 can be used to maintain a desired shape of the airbag cushion 46.

The airbag assemblies of the present disclosure can also include one or more vents. The vents can be used to release gas that is contained inside the airbag cushion after the airbag cushion has inflated to the inflated state. It may be desirable to release the gas that is contained inside the airbag cushion to provide clearance for the occupant to exit the vehicle after the airbag has inflated. In other circumstances it may be desirable to include a vent in an airbag assembly in order to permit gas to escape from the airbag cushion is the airbag cushion is blocked or restricted from inflating.

Figure 18A:
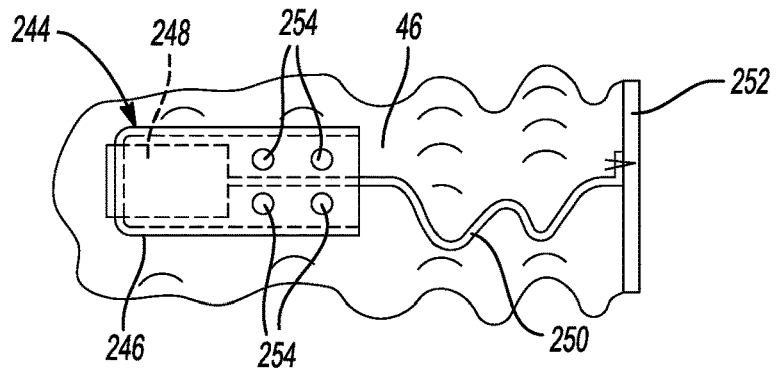
FIG. 18A is an illustration of an example tethered vent in an open position that can be used in an airbag assembly of the present disclosure.
Figure 18B:
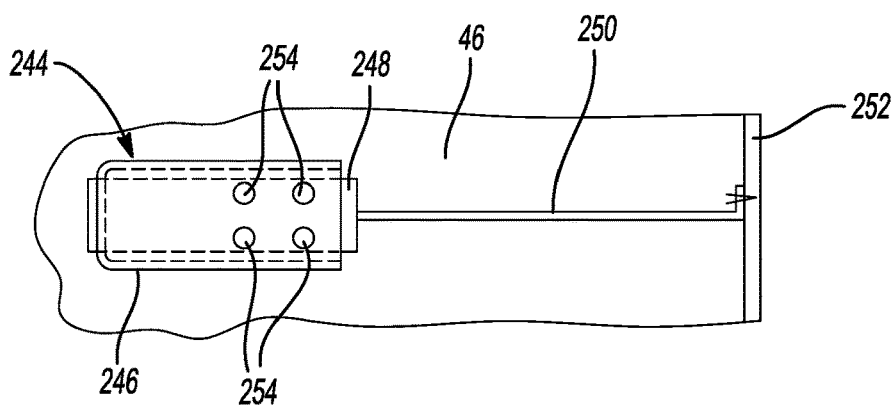
FIG. 18B is an illustration of the tethered vent of FIG. 18A in a closed position that can be used in an airbag assembly of the present disclosure.

In one example, the airbag assembly 40 can include a tethered vent 244. The tethered vent 244 is positioned on a wall of the airbag cushion 46. The tethered vent 244 includes a sleeve 246, a restrictor panel 248 and a vent tether 250. The vent tether is connected to the restrictor panel 248 and to a wall 252 of the airbag cushion 46. The tethered vent 244 includes one or more holes 254 that extend through the sleeve 246 and the airbag cushion 46. The sleeve 246 is connected to the airbag cushion 46 around an outer edge of the sleeve 246. The restrictor panel is connected to the sleeve on an end opposite the tethered vent 244. As shown in FIG. 18A, in the open position, the restrictor panel 248 is positioned away from the holes 254 such that gas can flow through the holes 254. The restrictor panel 248 is in a folded position and can be held in place by some tack stitches or other mechanical attachment (not shown). As shown in FIG. 18B, in the closed state, the restrictor panel 248 has been pulled by the vent and has moved to cover the holes 254 such that gas is restricted from flowing through the holes 254.

The tethered vent 244 moves from the open position (as shown in FIG. 18A) to the closed position (as shown in FIG. 18B), when the airbag cushion 46 inflates from the uninflated state to the inflated state. When the airbag cushion 46 is in the uninflated state, the vent tether 250 has slack such that it does not exert a force sufficient to move the restrictor panel 248. As such, the restrictor panel 248 remains in the position away from the holes 254. When the airbag cushion 46 inflates, the wall 252 moves away from the sleeve 246. As the wall 252 moves away from the sleeve 246, the vent tether 250 exerts a force on the restrictor panel 248 in a direction toward the holes 254. The vent tether 250 pulls the restrictor panel 248 over the holes 254 in the sleeve 246 when the airbag cushion 46 inflates to the inflated position. In the closed position, gas inside the airbag cushion 46 is restricted from flowing out of the holes 254. The tethered vent 244 can be used to limit or restrict the airbag cushion 46 from inflating if the airbag cushion 46 is blocked by an object in its deployment path.

Figure 19A:
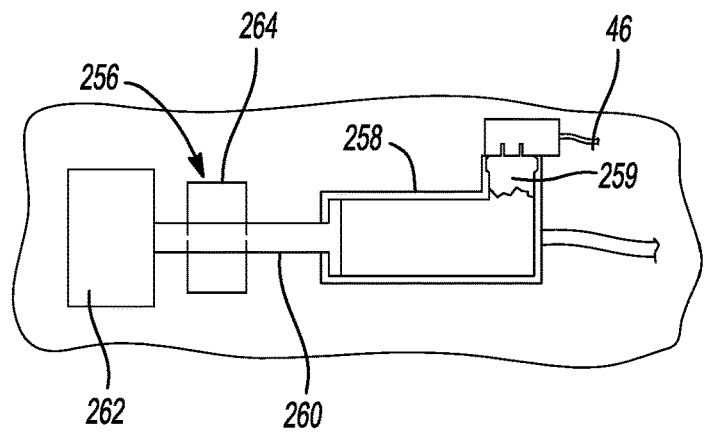
FIG. 19A is an illustration of an example pyrotechnic vent in an open position that can be used in an airbag assembly of the present disclosure.

In another example, the airbag assembly 40 can include an electronic or pyrotechnic vent 256. In one example, the pyrotechnic vent 256 can include a body 258, an arm 260, an initiator 259 and a cover panel 262. The pyrotechnic vent 256 can be mounted to the airbag cushion 46 or to the airbag housing 42. The pyrotechnic vent 256 is mounted adjacent a hole 264. The hole 264 extends through the airbag housing 42 and/or the airbag cushion 46 to permit gas to flow through the hole 264 when the pyrotechnic vent 256 is in the open state (as shown in FIG. 19A). As shown, the arm 260 projects away from the body 258 and positions the cover panel 262 away from the hole 264.

Figure 19B:
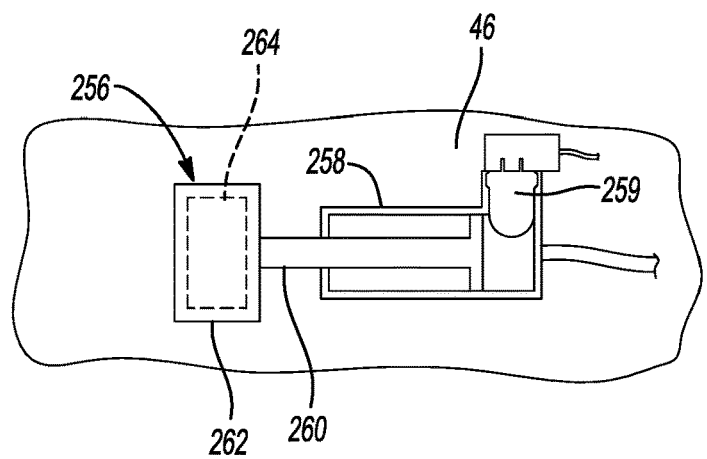
FIG. 19B is an illustration of the example pyrotechnic vent of FIG. 19B in the closed position that can be used in an airbag assembly of the present disclosure.

When the pyrotechnic vent 256 in the closed position, the arm 260 positions the cover panel 262 such that the cover panel 262 covers the hole 264. In the closed position (as shown in FIG. 19B), gas is restricted from flowing through the hole 264. In one example airbag assembly 40, the pyrotechnic vent 256 is initially positioned in the closed state. When the pyrotechnic vent 256 receives a control signal, the pyrotechnic vent 256 deploys the initiator 259. The initiator 259 expands in the body 258 and causes the arm 260 to move out of (or away) from the body 258 to move the cover panel 262 away from the hole 264 such that gas is permitted to escape through the hole 264.

The pyrotechnic vent 256 (or other electronically-controlled vent) can be connected to a control unit (not shown) that controls the operation of the pyrotechnic vent 256. In one example, the control unit can send a signal to the pyrotechnic vent 256 that causes the pyrotechnic vent 256 to move from the closed position to the open position after a predetermined amount of time has elapsed after the airbag assembly has inflated the airbag cushion 46 from the uninflated state to inflated state. In another example, the control unit can send a signal to the pyrotechnic vent 256 that causes the pyrotechnic vent 256 to move from the closed position to the open position after a door of the vehicle 20 has been commanded to be opened. Such venting of the airbag cushion 46 may be desirable to permit the occupant 30, 32 to exit (or be removed) from the vehicle 20 after the airbag cushion has been inflated.

Figure 20:
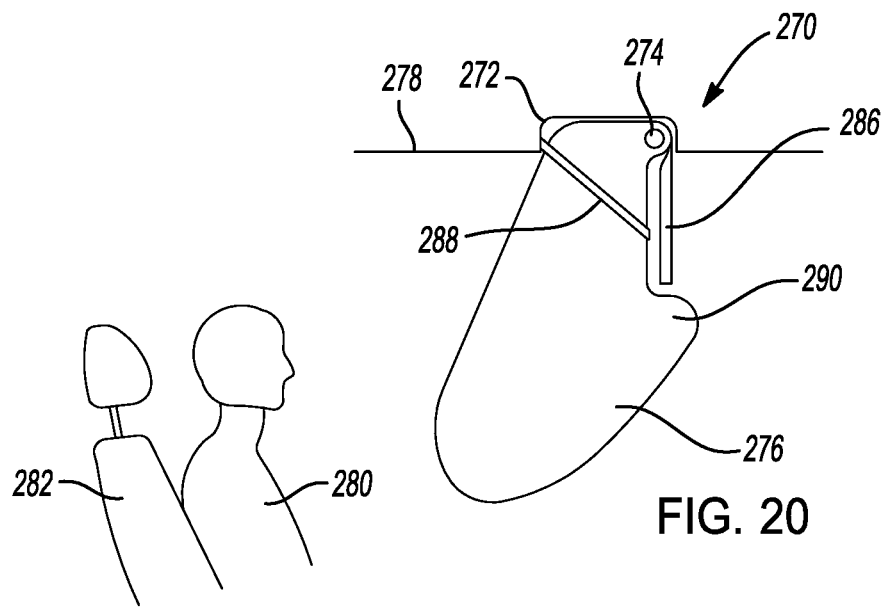
FIG. 20 is an illustration of another example airbag assembly in accordance with the present disclosure.
Figure 21:
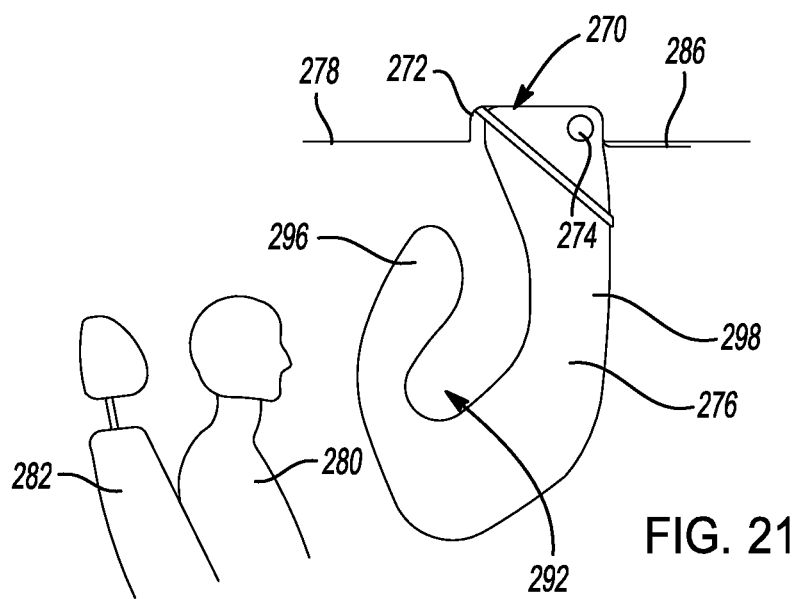
FIG. 21 is an illustration of another example airbag assembly in accordance with the present disclosure.
Figure 22:
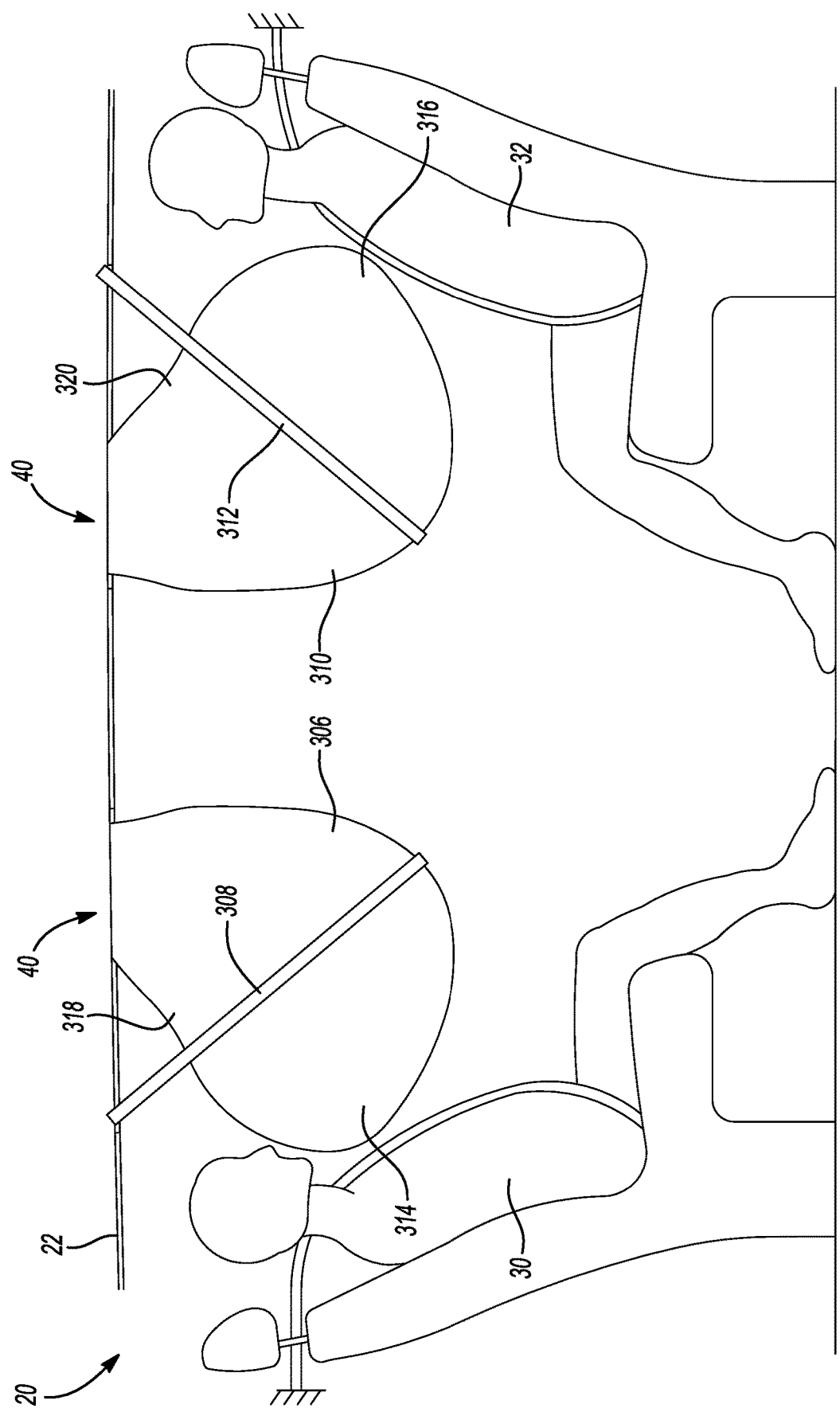
FIG. 22 is an illustration of a vehicle with example airbag assemblies in accordance with the present disclosure.

In other examples of the airbag assembly 40, the principles and elements of the present disclosure can be used in airbag assemblies with shapes and configurations different from those previously described. FIGS. 20-22 show various other example configurations of airbag assemblies in accordance with the present disclosure. As shown in FIG. 20, an airbag assembly 270 can include an airbag housing 272, an inflator 274 and an airbag cushion 276. The airbag assembly 270 is positioned in the roof 278 of a vehicle. When the airbag cushion 276 inflates to the inflated state, the airbag cushion 276 is positioned in front of an occupant 280 seated in a seat 282. In this example, the airbag cushion 276 is angled toward the occupant 280. The example airbag cushion 276 includes a tether 288 that wraps around the airbag cushion 276. The airbag cushion 276 also includes a door reaction foot 290. The door reaction foot 290, in this example, projects outward from the airbag cushion 276 at the bottom portion of the door 286.

As shown in FIG. 21, this example airbag cushion 276 includes a rounded shape with a void 292. In this example, the void 292 is positioned between a forward portion 296 and a rearward portion 298 of the airbag cushion 276. The forward portion 296 and the rearward portion 298 are separated by a gap that is located at or above a head of the occupant 280. The gap causes the void 292 to be discontinuous, in this example.

Referring now to FIG. 22, another example airbag assembly 40 is shown in an arrangement of the vehicle 20 in which the first occupant 30 is facing the second occupant 32. In this example, a first airbag cushion 306 is shown in the inflated state. The first airbag cushion 306 includes a wrap tether 308 that extends from the roof 22 of the vehicle and wraps around a side of the airbag cushion 306 positioned away from the occupant 30. A second airbag cushion 310 is also shown in the inflated state. The second airbag cushion 310 is similar to the first airbag cushion 306 and includes a wrap tether 312 that extends from the roof of the vehicle 20 and wraps around the second airbag cushion 310 positioned away from the occupant 32.

The first airbag cushion 306 and the second airbag cushion 310 are positioned such that lower portions 314, 316 of the first and second airbag cushions 306, 310 are located closer to the occupants 30, 32, respectively, than the upper portions 318, 320. In this manner, the heads of the occupants 30, 32 can rotate relative to the torsos of the occupants 30, 32 to reduce the forces and moments on the necks of the occupants 30, 32 when the occupants contact the first and second airbag cushions 306, 310. In addition, the wrap tethers 308, 312 limit or restrict the movement of the airbag cushions 306, 310 from moving in a direction away from the occupants 30, 32, respectively. In addition, the wrap tethers 308, 312 are attached at the roof 22 at a horizontal position closer to the occupant 30, 32 than the location where the airbag cushions 306, 310 are mounted at the roof 22. In this position, the location of the attachment of the wrap tethers 308, 312 are separated from the airbag cushions 306, 310 along the roof 22. The wrap tethers 308, 312 can be positioned on (and attached to) the airbag cushion 306, 310 on a back surface or partially on a bottom surface as shown in FIG. 22.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An airbag assembly for mounting above an occupant in a vehicle, the airbag assembly comprising:
   an airbag housing; and
   an airbag cushion connected to the housing and deployable from an uninflated state to an inflated state, the airbag cushion including a forward portion and a rearward portion, the forward portion positioned closer to the occupant than the rearward portion when the airbag cushion is in the inflated state, the forward portion separated from the rearward portion by a void, the void configured to cause a head of the occupant to rotate forward relative to a torso of the occupant when the occupant contacts the airbag cushion, wherein the airbag cushion includes a lower portion connecting the forward portion to the rearward portion, the lower portion positioned lower than the forward portion relative to the occupant when the airbag cushion deploys to the inflated state, and wherein the airbag cushion includes an inflating leg that projects downward from the forward portion, the leg positioned below the lower portion relative to the occupant when the airbag cushion is in the inflated state.

2. The airbag assembly of claim 1 wherein the airbag housing is configured to mount to a roof of the vehicle and the airbag cushion deploys downward to a position in front of the occupant and the forward portion curves back toward the rearward portion when the airbag cushion moves from the uninflated state to the inflated state such that a side profile of the airbag cushion has a J-shape.

3. The airbag assembly of claim 1 wherein the forward portion is connected to the rearward portion at a side of the void opposite to the lower portion.

4. The airbag assembly of claim 1 wherein the lower portion is positioned closer to the occupant than a top of the forward portion when the airbag cushion is in the inflated state such that the head of the occupant rotates forward relative to the torso of the occupant when the occupant contacts the airbag cushion.

5. The airbag assembly of claim 1 with an inflating upper portion positioned above the void, the inflating upper portion connecting the forward portion to the rearward portion.

6. The airbag assembly of claim 1 wherein:
   the airbag cushion includes a first panel that defines an inner surface of the airbag cushion adjacent the void and a second panel that defines an outer surface of the airbag cushion and is joined to the first panel, the first panel and the second panel defining a central chamber of the airbag cushion;
   the first panel is made of a woven fiber material having fibers oriented parallel to and perpendicular to a longitudinal direction of the airbag cushion; and the second panel is made of the woven fiber material having fibers oriented diagonally with respect to the longitudinal direction of the airbag cushion.

7. The airbag assembly of claim 1 wherein the airbag cushion includes an attachment tab that connects a terminal end of the forward portion to the rearward portion to maintain a side profile of the airbag cushion.

8. The airbag assembly of claim 1 wherein the airbag cushion includes a plurality of longitudinal chambers configured to stiffen the airbag cushion.

9. An airbag assembly for mounting above an occupant in a vehicle the airbag assembly comprising:
an airbag housing; and
an airbag cushion connected to the housing and deployable from an uninflated state to an inflated state, the airbag cushion including a forward portion and a rearward portion, the forward portion positioned closer to the occupant than the rearward portion when the airbag cushion is in the inflated state, the forward portion separated from the rearward portion by a void, the void configured to cause a head of the occupant to rotate forward relative to a torso of the occupant when the occupant contacts the airbag, cushion, wherein the airbag cushion includes a first panel positioned opposite to a second panel, the first panel and the second panel forming a recessed portion between a first longitudinal chamber and a second longitudinal chamber, the recessed portion having a first inflated thickness that is less than a second inflated thickness of the first and second longitudinal chambers when the airbag cushion deploys to the inflated state, and wherein the recessed portion of the airbag cushion remains uninflated when the airbag cushion deploys to the inflated state.

10. The airbag assembly of claim 9 wherein the first panel and the second panel of the airbag cushion further define at least one inflating rib that laterally connects the first longitudinal chamber to the second longitudinal chamber.

11. The airbag assembly of claim 9 wherein the airbag cushion includes a tether connecting the forward portion to the rearward portion to limit a distance between the forward portion and the rearward portion.

12. The airbag assembly of claim 9 wherein the airbag cushion further includes an internal tether, the first panel and the second panel positioned opposite to one another to define a central chamber of the airbag cushion, the internal tether connected between the first panel and the second panel inside the central chamber to define a size of the airbag cushion when the airbag cushion deploys to the inflated state.

13. The airbag assembly of claim 9 wherein the airbag cushion includes a void-shaping tether, the void-shaping tether connecting the forward portion to the rearward portion on opposite sides of the void to define a size of the void when the airbag cushion deploys to the inflated state.

14. An airbag assembly for mounting above an occupant in a vehicle, the airbag assembly comprising:
an airbag housing; and
an airbag cushion connected to the housing and deployable from an uninflated state to an inflated state, the airbag cushion including a forward portion and a rearward portion, the forward portion positioned closer to the occupant than the rearward portion when the airbag cushion is in the inflated state, the forward portion separated from the rearward portion by a void, the void configured to cause a head of the occupant to rotate forward relative to a torso of the occupant when the occupant contacts the airbag cushion, wherein:
the airbag cushion includes a first panel and a second panel, the first panel and the second panel positioned opposite to one another to define a central chamber of the airbag cushion;
the airbag cushion further including at least one of a corner tether and a bend tether, the corner tether positioned in the void at a curved portion of the airbag cushion, and the bend tether connected between the first panel and the second panel at the curved portion of the airbag cushion; and
the at least one of the corner tether and the bend tether causes the airbag cushion to have a predetermined shape when the airbag cushion deploys to the inflated state.

15. The airbag assembly of claim 14 comprising at least one of a tethered vent and a pyrotechnic vent.

16. The airbag assembly of claim 14 comprising an airbag vent configured to move from a closed position to an open position when a predetermined amount of time has elapsed since the airbag cushion deployed to the inflated state or a door of the vehicle is opened.

17. The airbag assembly of claim 14 further comprising a tethered vent that is configured to move from an open position to a closed position when the airbag cushion inflates to the inflated state and to not move from the open position to the closed position when an obstacle prevents the airbag cushion from inflating to the inflated state.

* * * * *